(12) United States Patent
Komatsu et al.

(10) Patent No.: US 7,900,440 B2
(45) Date of Patent: Mar. 8, 2011

(54) EXHAUST EMISSION CONTROL DEVICE AND METHOD FOR INTERNAL COMBUSTION ENGINE AND ENGINE CONTROL UNIT

(75) Inventors: Nobuhiro Komatsu, Saitama (JP); Norio Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 564 days.

(21) Appl. No.: 12/072,632

(22) Filed: Feb. 27, 2008

(65) Prior Publication Data
US 2008/0202100 A1 Aug. 28, 2008

(30) Foreign Application Priority Data
Feb. 27, 2007 (JP) ................. 2007-047893

(51) Int. Cl.
*F01N 3/00* (2006.01)
(52) U.S. Cl. ................. 60/285; 60/274; 60/295; 60/297
(58) Field of Classification Search ............ 60/274, 60/278, 280, 285, 295, 297, 301
See application file for complete search history.

(56) References Cited

U.S. PATENT DOCUMENTS

| | | | | |
|---|---|---|---|---|
| 6,925,797 B2 * | 8/2005 | Taga et al. | ........... | 60/301 |
| 7,594,390 B2 * | 9/2009 | Kitahara | ........... | 60/285 |
| 7,600,373 B2 * | 10/2009 | Matsuno et al. | ........... | 60/295 |
| 7,631,493 B2 * | 12/2009 | Shirakawa et al. | ........... | 60/297 |
| 7,669,410 B2 * | 3/2010 | Nagaoka et al. | ........... | 60/286 |
| 7,758,833 B2 * | 7/2010 | Odajima et al. | ........... | 423/213.2 |
| 7,775,037 B2 * | 8/2010 | Ishibashi | ........... | 60/287 |
| 2005/0223698 A1 | 10/2005 | Murata et al. | | |

FOREIGN PATENT DOCUMENTS

| | | |
|---|---|---|
| DE | 19923481 A1 | 11/2000 |
| EP | 0892158 A2 | 1/1999 |
| EP | 1411231 A2 | 4/2004 |
| EP | 1544429 A1 | 6/2005 |
| JP | 2003-166415 | 6/2003 |

OTHER PUBLICATIONS

European Search Report for Application No. 08003195.8-2311, dated Apr. 10, 2008.

* cited by examiner

*Primary Examiner* — Binh Q Tran
(74) *Attorney, Agent, or Firm* — Nelson Mullins Riley & Scarborough LLP; Anthony A. Laurentano

(57) ABSTRACT

An exhaust emission control device for an internal combustion engine, which is capable of completing a regeneration operation in a short time period, thereby making it possible to ensure excellent fuel economy. The exhaust emission control device includes a NOx catalyst, an ECU, and a NOx catalyst temperature sensor. The ECU sets a control parameter for controlling the operation of the engine to first to third predetermined values. The ECU selects the first predetermined value when the temperature of the NOx catalyst detected by the NOx catalyst temperature sensor is within a target temperature range, and selects the second predetermined value when the detected temperature of the NOx catalyst is lower than the target temperature range. Further, the ECU selects the third predetermined values when the detected temperature of the NOx catalyst is higher than the target temperature range.

15 Claims, 15 Drawing Sheets

FIG. 8

| | LOW ← NE → HIGH | |
|---|---|---|
| SMALL ↑ PMCMD ↓ LARGE | QINJCMD111 ⋯⋯⋯ QINJCMD11j | QINJCMD1i1 ⋯⋯⋯ QINJCMD1ij |

FIG. 9

| | LOW ← NE → HIGH | |
|---|---|---|
| SMALL ↑ PMCMD ↓ LARGE | TINJCMD111 ⋯⋯⋯ TINJCMD11j | TINJCMD1i1 ⋯⋯⋯ TINJCMD1ij |

FIG. 10

| | LOW ← NE → HIGH | |
|---|---|---|
| SMALL ↑ PMCMD ↓ LARGE | PRAILCMD111 ⋯⋯⋯ PRAILCMD11j | PRAILCMD1i1 ⋯⋯⋯ PRAILCMD1ij |

FIG. 11

| | LOW ← NE → HIGH |
|---|---|
| SMALL ↑ PMCMD ↓ LARGE | PSCMD111 ········ PSCMD11j<br>⋮     ⋱     ⋮<br>PSCMD1i1 ········ PSCMD1ij |

FIG. 12

| | LOW ← NE → HIGH |
|---|---|
| SMALL ↑ PMCMD ↓ LARGE | THCMD111 ········ THCMD11j<br>⋮     ⋱     ⋮<br>THCMD1i1 ········ THCMD1ij |

FIG. 13

| | LOW ← NE → HIGH |
|---|---|
| SMALL ↑ PMCMD ↓ LARGE | QPOSTCMD111 ········ QPOSTCMD11j<br>⋮     ⋱     ⋮<br>QPOSTCMD1i1 ········ QPOSTCMD1ij |

FIG. 14

| | LOW ← NE → HIGH |
|---|---|
| SMALL ↑ PMCMD ↓ LARGE | QINJCMD211 ········ QINJCMD21j<br>⋮ ⋮<br>QINJCMD2i1 ········ QINJCMD2ij |

FIG. 15

| | LOW ← NE → HIGH |
|---|---|
| SMALL ↑ PMCMD ↓ LARGE | TINJCMD211 ········ TINJCMD21j<br>⋮ ⋮<br>TINJCMD2i1 ········ TINJCMD2ij |

FIG. 16

| | LOW ← NE → HIGH |
|---|---|
| SMALL ↑ PMCMD ↓ LARGE | PRAILCMD211 ········ PRAILCMD21j<br>⋮ ⋮<br>PRAILCMD2i1 ········ PRAILCMD2ij |

FIG. 17

| | LOW ← NE → HIGH |
|---|---|
| SMALL ↑ PMCMD ↓ LARGE | PSCMD211 ········ PSCMD21j<br>⋮    ⋱    ⋮<br>PSCMD2i1 ········ PSCMD2ij |

FIG. 18

| | LOW ← NE → HIGH |
|---|---|
| SMALL ↑ PMCMD ↓ LARGE | THCMD211 ········ THCMD21j<br>⋮    ⋱    ⋮<br>THCMD2i1 ········ THCMD2ij |

FIG. 19

| | LOW ← NE → HIGH |
|---|---|
| SMALL ↑ PMCMD ↓ LARGE | QPOSTCMD211 ········ QPOSTCMD21j<br>⋮    ⋱    ⋮<br>QPOSTCMD2i1 ········ QPOSTCMD2ij |

FIG. 20

| | LOW ← NE → HIGH |
|---|---|
| SMALL ↑ PMCMD ↓ LARGE | QINJCMD311 ········ QINJCMD31j<br>⋮    ⋱    ⋮<br>QINJCMD3i1 ········ QINJCMD3ij |

FIG. 21

| | LOW ← NE → HIGH |
|---|---|
| SMALL ↑ PMCMD ↓ LARGE | TINJCMD311 ········ TINJCMD31j<br>⋮    ⋱    ⋮<br>TINJCMD3i1 ········ TINJCMD3ij |

FIG. 22

| | LOW ← NE → HIGH |
|---|---|
| SMALL ↑ PMCMD ↓ LARGE | PRAILCMD311 ········ PRAILCMD31j<br>⋮    ⋱    ⋮<br>PRAILCMD3i1 ········ PRAILCMD3ij |

FIG. 23

|  | LOW ← NE → HIGH |
|---|---|
| SMALL ↑ PMCMD ↓ LARGE | PSCMD311 ········ PSCMD31j<br>⋮ ⋱ ⋮<br>PSCMD3i1 ········ PSCMD3ij |

FIG. 24

|  | LOW ← NE → HIGH |
|---|---|
| SMALL ↑ PMCMD ↓ LARGE | THCMD311 ········ THCMD31j<br>⋮ ⋱ ⋮<br>THCMD3i1 ········ THCMD3ij |

FIG. 25

|  | LOW ← NE → HIGH |
|---|---|
| SMALL ↑ PMCMD ↓ LARGE | QPOSTCMD311 ········ QPOSTCMD31j<br>⋮ ⋱ ⋮<br>QPOSTCMD3i1 ········ QPOSTCMD3ij |

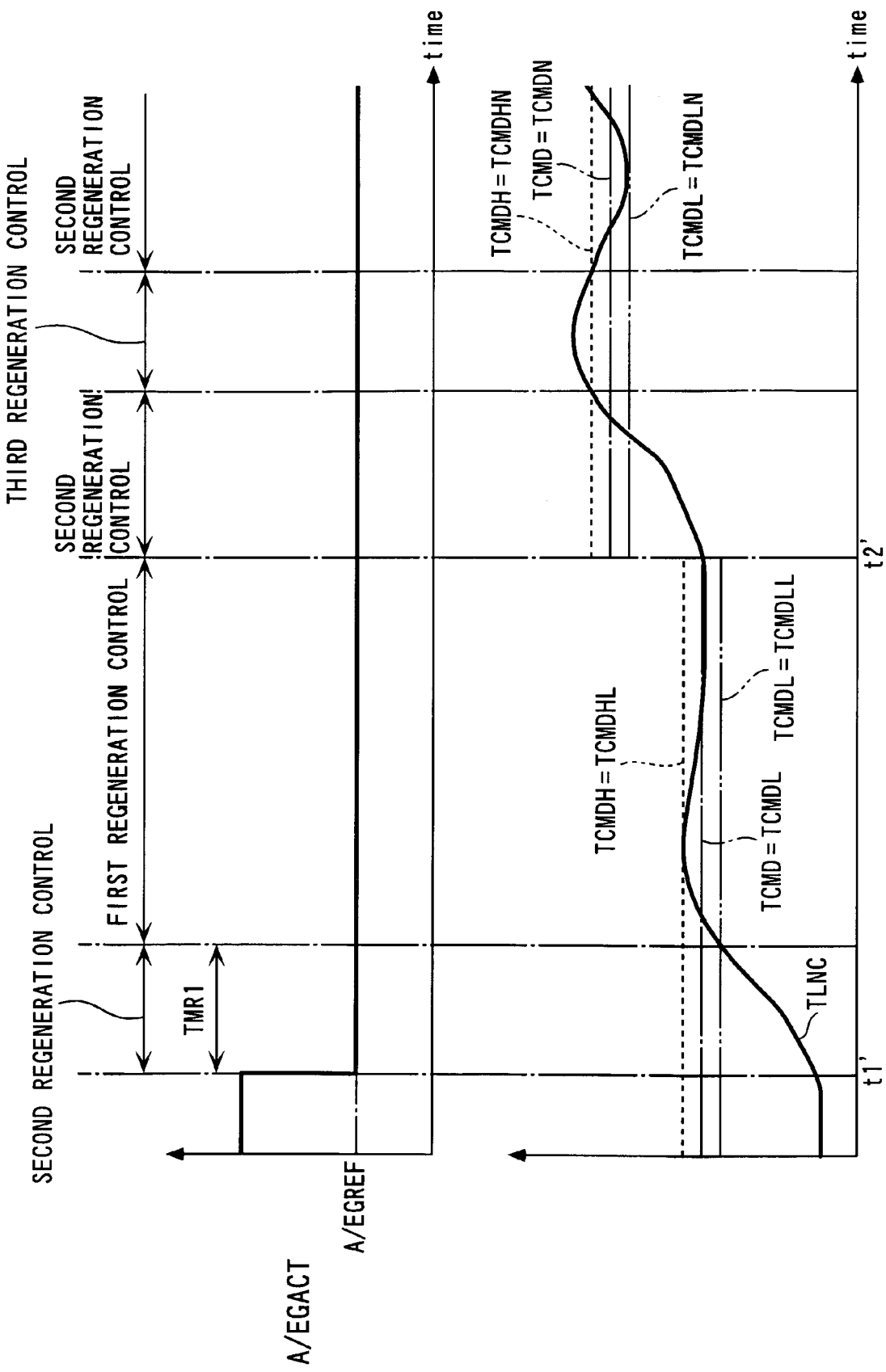

EXHAUST EMISSION CONTROL DEVICE AND METHOD FOR INTERNAL COMBUSTION ENGINE AND ENGINE CONTROL UNIT

BACKGROUND OF THE INVENTION

1. Field of the Invention

The present invention relates to an exhaust emission control device and method for an internal combustion engine, and an engine control unit, and more particularly to an exhaust emission control device and method for an internal combustion engine including a NOx catalyst that is disposed in the exhaust system of the engine, for trapping NOx in exhaust gases emitted from the engine, and an engine control unit.

2. Description of the Related Art

Conventionally, there has been proposed an exhaust emission control device of this kind, such as an exhaust emission control device for a diesel engine (hereinafter simply referred to as "the engine"), e.g. in Japanese Laid-Open Patent Publication (Kokai) No. 2003-166415. In this exhaust emission control device, to restore the NOx trapping performance of a NOx catalyst for regeneration of the NOx catalyst, a regeneration operation in which SOx deposited on the NOx catalyst is reduced and the reduced SOx is released is carried out as follows: Post injection for injecting fuel from a fuel injection valve during the expansion stroke or the exhaust stroke is carried out, and the amount of fuel injected by the post injection and the amount of EGR gases are controlled, whereby the temperature of the NOx catalyst is held not lower than a predetermined temperature that is suitable for reduction of SOx. In this state, by controlling a reducing agent addition valve provided in an exhaust pipe, supply of SOx-reducing fuel to the NOx catalyst and interruption thereof are repeatedly carried out, whereby the NOx catalyst is prevented from being overheated by combustion of fuel supplied from the reducing agent addition valve.

As described above, in the conventional exhaust emission control device, the supply of SOx-reducing fuel is interrupted, and hence to cause the NOx catalyst to completely release SOx deposited thereon, it is required to set a long execution time period of the regeneration operation. In the conventional exhaust emission control device, however, to control the temperature of the NOx catalyst to a predetermined value, the post injection that does not contribute to an output of the engine is carried out during execution of the regeneration operation, so that when the execution time period of the regeneration operation is set to be long as described above, the amount of fuel injected by the post injection increases to degrade fuel economy. Further, since supply of fuel by the reducing agent addition valve, and control of the amount of EGR gases for controlling the temperature of the NOx catalyst are executed in parallel independently of each other, the amount of EGR gases is sometimes controlled such that it becomes too small or too large, irrespective of the load on the engine. In such a case, exhaust emissions increase, and drivability is degraded due to the incapability of obtaining a desired output of the engine.

SUMMARY OF THE INVENTION

It is an object of the present invention to provide an exhaust emission control device and method for an internal combustion engine, and an engine control unit, which are capable of completing a regeneration operation in a short time period, thereby making it possible to ensure excellent fuel economy.

To attain the above object, in a first aspect of the present invention, there is provided an exhaust emission control device for an internal combustion engine, comprising a NOx catalyst that is disposed in an exhaust system of the engine, for trapping NOx in exhaust gases emitted from the engine, and regeneration operation-executing means for executing a regeneration operation for reducing SOx deposited on the NOx catalyst and causing the NOx catalyst to release the reduced SOx, the regeneration operation-executing means having first regeneration operation-executing means for setting a control parameter for controlling operation of the engine to a first predetermined value that is capable of controlling exhaust gases to a predetermined reducing condition, and at the same time, controlling a temperature of the NOx catalyst within a predetermined target temperature range including a predetermined target temperature, second regeneration operation-executing means for setting the control parameter to a second predetermined value that is capable of controlling exhaust gases to a predetermined reducing condition, and at the same time, controlling the temperature of the NOx catalyst to a temperature higher than the target temperature range, and third regeneration operation-executing means for setting the control parameter to a third predetermined value that is capable of controlling exhaust gases to a predetermined reducing condition, and controlling the temperature of the NOx catalyst to a temperature lower than the target temperature range, the exhaust emission control device further comprising catalyst temperature-detecting means for detecting the temperature of the NOx catalyst, and regeneration operation-selecting means for selecting, as the regeneration operation-executing means, the first regeneration operation-executing means when the detected temperature of the NOx catalyst is within the target temperature range, the second regeneration operation-executing means when the detected temperature of the NOx catalyst is lower than the target temperature range, and the third regeneration operation-executing means when the detected temperature of the NOx catalyst is higher than the target temperature range.

With the configuration of the exhaust emission control device according to the first aspect of the present invention, the first regeneration operation-executing means sets the control parameter for controlling the operation of the engine to the first predetermined value that is capable of controlling exhaust gases to the predetermined reducing condition, and controlling the temperature of the NOx catalyst (hereinafter referred to as "the catalyst temperature") within the predetermined target temperature range including the predetermined target temperature, whereby the regeneration operation for reducing SOx deposited on the NOx catalyst and causing the NOx catalyst to release the reduced SOx (hereinafter referred to as "the first regeneration operation") is carried out. Further, the second regeneration operation-executing means sets the control parameter to the second predetermined value that is capable of controlling exhaust gases to the predetermined reducing condition, and controlling the catalyst temperature to a temperature higher than the target temperature range, whereby the regeneration operation (hereinafter referred to as "the second regeneration operation") is carried out. Furthermore, the third regeneration operation-executing means sets the control parameter to the third predetermined value that is capable of controlling exhaust gases to the predetermined reducing condition, and controlling the catalyst temperature to a temperature lower than the target temperature range, whereby the regeneration operation (hereinafter referred to as "the third regeneration operation") is carried out. Further, the regeneration operation-selecting means, selects as the regeneration operation-executing means, the first regeneration operation-executing means when the detected the catalyst temperature is within the target temperature range, the second regeneration operation-executing means when the detected catalyst temperature is lower than the target temperature range, and the third regeneration operation-executing means when the detected catalyst temperature is higher than the target temperature range.

As described above, when the catalyst temperature is lower than the target temperature range, the second regeneration operation is carried out to raise the catalyst temperature, and when the catalyst temperature is higher than the target temperature range, the third regeneration operation is carried out to lower the catalyst temperature. Further, when the catalyst temperature is within the target temperature range, the first regeneration operation is carried out to maintain the catalyst temperature within the target temperature range. This makes it possible to control the catalyst temperature in the vicinity of the target temperature range. Further, all the first to third predetermined values are set such that they can control exhaust gases to the predetermined reducing condition, and hence as described above, it is possible to control exhaust gases to the predetermined reducing condition while controlling the catalyst temperature in the vicinity of the target temperature range. Therefore, it is possible to reduce SOx deposited on the NOx catalyst to cause the NOx catalyst to release the reduced SOx, thereby making it possible to properly regenerate the NOx catalyst.

Further, since the catalyst temperature can be controlled in the vicinity of the target temperature range to thereby prevent the NOx catalyst from being overheated, there is no need to interrupt the regeneration operation so as to prevent the NOx catalyst from being overheated, which makes it possible to continuously carry out the regeneration operation. Therefore, compared with the control by the conventional exhaust emission control device, which carries out the post injection for maintaining the catalyst temperature, while performing supply of fuel from the reducing agent addition valve and interruption thereof, it is possible to terminate the regeneration operation in a shorter time period, thereby making it possible to enhance fuel economy.

On the other hand, for example, when the control parameter is calculated as occasion demands with a predetermined feedback control algorithm for controlling exhaust gases and the catalyst temperature to the reducing condition and the target temperature range, respectively, to thereby feedback-control the reducing condition of exhaust gases and the catalyst temperature, it is sometimes impossible to properly control the exhaust gases and the catalyst temperature due to interference between the two kinds of feedback control, and computation load becomes too large. Hereinafter, such feedback control as described above is referred to as "control parameter calculation-type feedback control".

According to the first aspect of the present invention, instead of performing the above-mentioned control parameter calculation-type feedback control, the first to third regeneration operations, in which the control parameters are set to the respective first to third predetermined values set in advance as described above, are selectively applied according to the relationship between the catalyst temperature and the target temperature range. This makes it possible to properly control exhaust gases and the catalyst temperature in the vicinities of the predetermined reducing condition and target temperature range, respectively, without causing the above-described interference between feedback controls, and easily determine the control parameters to thereby making it possible to reduce the computation load.

The exhaust emission control device further comprises predetermined value-storing means for storing relationships between an operating condition of the engine, and the first to third predetermined values, respectively, operating condition-detecting means for detecting the operating condition of the engine, and predetermined value-setting means for setting one of the first to third predetermined values used by one of the first to third generation operation-executing means selected by the regeneration operation-selecting means, according to the detected operating condition of the engine, based on the relationships stored in the predetermined value-storing means.

With the configuration of the preferred embodiment, the predetermined value-storing means stores the relationships between an operating condition of the engine and the respective first to third predetermined values, and the predetermined value-setting means sets the predetermined value used by the selected regeneration operation-executing means, according to the detected operating condition of the engine, based on the above-described relationships stored in the predetermined value-storing means. Therefore, by setting the first to third predetermined values in advance to values suitable for the operating conditions of the engine for storage, and storing them, it is possible to set the control parameter to one of the predetermined values, suitable for an actual operating condition of the engine, during execution of the regeneration operation, thereby making it possible to ensure reduced exhaust emissions and excellent drivability of the engine.

On the other hand, when the regeneration operation is carried out using only the second and third regeneration operation-executing means according to the relationship between the catalyst temperature and the target temperature range, the regeneration operation-executing means is frequently switched between the second and third regeneration operation-executing means so as to control the catalyst temperature in the vicinity of the target temperature range. This makes drivability and reduction of exhaust emissions unstable. According to this preferred embodiment, the first regeneration operation continues to be carried out by using not only the second and third regeneration operation-executing means but also the first regeneration operation-executing means that is capable of controlling the catalyst temperature within the target temperature range insofar as the catalyst temperature is within the target temperature range. This makes it possible to suppress switching of the regeneration operation-executing means, thereby making it possible to ensure stable and excellent drivability and reduced exhaust emissions.

Preferably, the exhaust emission control device further comprises execution time period-setting means for setting an execution time period of the regeneration operation executed by the second regeneration operation-executing means or the third regeneration operation-executing means, to a longer time period as a difference between the temperature of the NOx catalyst and the target temperature is larger, when the second regeneration operation-executing means or the third regeneration operation-executing means is selected, wherein the regeneration operation-selecting means holds a current selection until the set execution time period of the regeneration operation executed by the second regeneration operation-executing means or the third regeneration operation-executing means has elapsed.

With the configuration of the preferred embodiment, the execution time period-setting means sets the execution time period of regeneration operation executed by the second regeneration operation-executing means or the third regeneration operation-executing means selected by the regeneration operation-selecting means. Until the set execution time period has elapsed, the regeneration operation-selecting means holds the current selection by the same, and the second or third regeneration operation continues to be executed. Further, the execution time period is set to a longer time period as the difference between the catalyst temperature and the target temperature is larger, so that it is possible to sufficiently raise or lower the catalyst temperature.

Preferably, the control parameter includes at least one of injection timing of fuel to be supplied to the engine, injection pressure of the fuel, boost pressure of intake air drawn into the engine, and a degree of opening of a throttle valve for adjusting an intake air amount, and the second predetermined value is set to a more retarded value than the first predetermined value when the at least one control parameter is the injection timing, whereas when the at least one control parameter is the injection pressure of the fuel, the boost pressure of the intake air, or the degree of opening of the throttle valve, the second predetermined value is set to a smaller value than the first predetermined value.

The injection timing of fuel and the injection pressure of the fuel are parameters of fuel, while the boost pressure and the degree of opening of the throttle valve (throttle valve opening) are parameters of intake air. Since exhaust gases are generated by combustion of the fuel and the intake air, the injection timing, the injection pressure, the boost pressure and the throttle valve opening each have a high correlation with the reducing condition of exhaust gases and the catalyst temperature. With the configuration of the preferred embodiment, at least one of the injection timing, the injection pressure, the boost pressure and the throttle valve opening is used as the control parameter, so that it is possible to more properly control exhaust gases and the catalyst temperature in the vicinities of the predetermined reducing condition and target temperature range, respectively.

Further, the peak of combustion of supplied fuel deviates toward the exhaust stroke as the injection timing is more retarded, whereby burned gases hardly cooled in the cylinders are emitted therefrom, which raises the temperature of exhaust gases to make the catalyst temperature higher. Furthermore, the degree of atomization of fuel is lower as the injection pressure is lower, whereby the peak of the combustion deviates toward the exhaust stroke, to make the catalyst temperature higher. Further, as the boost pressure is smaller, or as the throttle valve opening is smaller, the intake air amount becomes smaller, and the air-fuel ratio of a mixture supplied to the engine deviates toward the rich side, which increases the amount of unburned fuel to be burned in the exhaust system, including the NOx catalyst. This makes the catalyst temperature higher.

According to this preferred embodiment, the second predetermined value, which is used as the control parameter in the second regeneration operation, is set to be more retarded than the first predetermined value used in the first regeneration operation when the control parameter is the injection timing, whereas when the control parameter is the injection pressure, the boost pressure or the throttle valve opening, the second predetermined value is set to be smaller than the first predetermined value. Therefore, in the second regeneration operation, it is possible to properly control the catalyst temperature to a temperature higher than the target temperature range.

The control parameter includes at least one of injection timing of fuel to be supplied to the engine, injection pressure of the fuel, boost pressure of intake air drawn into the engine, and a degree of opening of a throttle valve for adjusting an intake air amount, and the third predetermined value is set to a more advanced value than the first predetermined value when the at least one control parameters is the injection timing, whereas when the at least one control parameter is the injection pressure of the fuel, the boost pressure of the intake air, or the degree of opening of the throttle valve, the third predetermined value is set to a larger value than the first predetermined value.

With the configuration of the preferred embodiment, similarly to the above-described preferred embodiment, at least one of the injection timing, the injection pressure, the boost pressure and the throttle valve opening is used as the control parameter, so that it is possible to more properly control exhaust gases and the catalyst temperature in the vicinities of the predetermined reducing condition and target temperature range, respectively. Further, inversely to the above-described preferred embodiment, the third predetermined value is set to a more advanced value than the first predetermined value when the control parameter is the injection timing, whereas when the control parameter is the injection pressure, the boost pressure or the throttle valve opening, the third predetermined value is set to a larger value than the first predetermined value. Therefore, in the third regeneration operation, it is possible to properly control the catalyst temperature to a temperature lower than the target temperature range.

To attain the above object, in a second aspect of the present invention, there is provided an exhaust emission control method for an internal combustion engine including a NOx catalyst that is disposed in an exhaust system of the engine, for trapping NOx in exhaust gases emitted from the engine, comprising a regeneration operation-executing step of executing a regeneration operation for reducing SOx deposited on the NOx catalyst and causing the NOx catalyst to release the reduced SOx, the regeneration operation-executing step having a first regeneration operation-executing step of setting a control parameter for controlling operation of the engine to a first predetermined value that is capable of controlling exhaust gases to a predetermined reducing condition, and at the same time, controlling a temperature of the NOx catalyst within a predetermined target temperature range including a predetermined target temperature, a second regeneration operation-executing step of setting the control parameter to a second predetermined value that is capable of controlling exhaust gases to a predetermined reducing condition, and at the same time, controlling the temperature of the NOx catalyst to a temperature higher than the target temperature range, and a third regeneration operation-executing step of setting the control parameter to a third predetermined value that is capable of controlling exhaust gases to a predetermined reducing condition, and controlling the temperature of the NOx catalyst to a temperature lower than the target temperature range, the exhaust emission control method further comprising a catalyst temperature-detecting step of detecting the temperature of the NOx catalyst, and a regeneration operation-selecting of selecting, as the regeneration operation-executing step, the first regeneration operation-executing step when the detected temperature of the NOx catalyst is within the target temperature range, the second regeneration operation-executing step when the detected temperature of the NOx catalyst is lower than the target temperature range, and the third regeneration operation-executing step when the detected temperature of the NOx catalyst is higher than the target temperature range.

With the configuration of the exhaust emission control method according to the second aspect of the present invention, it is possible to obtain the same advantageous effects as provided by the first aspect of the present invention.

Preferably, the exhaust emission control method further comprises a predetermined value-storing step of storing relationships between an operating condition of the engine, and the first to third predetermined values, respectively, an operating condition-detecting step of detecting the operating condition of the engine, and a predetermined value-setting step of setting one of the first to third predetermined values used in one of the first to third generation operation-executing step selected in the regeneration operation-selecting step, according to the detected operating condition of the engine, based on the relationships stored in the predetermined value-storing step.

Preferably, the exhaust emission control method further comprises an execution time period-setting step setting an execution time period of the regeneration operation executed in the second regeneration operation-executing step or the third regeneration operation-executing step, to a longer time period as a difference between the temperature of the NOx catalyst and the target temperature is larger, when the second regeneration operation-executing step or the third regeneration operation-executing step is selected, wherein the regeneration operation-selecting step holds a current selection until the set execution time period of the regeneration operation executed in the second regeneration operation-executing step or the third regeneration operation-executing step has elapsed.

Preferably, the control parameter includes at least one of injection timing of fuel to be supplied to the engine, injection pressure of the fuel, boost pressure of intake air drawn into the engine, and a degree of opening of a throttle valve for adjusting an intake air amount, and the second predetermined value is set to a more retarded value than the first predetermined value when the at least one control parameter is the injection timing, whereas when the at least one control parameter is the injection pressure of the fuel, the boost pressure of the intake air, or the degree of opening of the throttle valve, the second predetermined value is set to a smaller value than the first predetermined value.

Preferably, the control parameter includes at least one of injection timing of fuel to be supplied to the engine, injection pressure of the fuel, boost pressure of intake air drawn into the engine, and a degree of opening of a throttle valve for adjusting an intake air amount, and the third predetermined value is set to a more advanced value than the first predetermined value when the at least one control parameters is the injection timing, whereas when the at least one control parameter is the injection pressure of the fuel, the boost pressure of the intake air, or the degree of opening of the throttle valve, the third predetermined value is set to a larger value than the first predetermined value.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a compute to execute an exhaust emission control method for an internal combustion engine including a NOx catalyst that is disposed in an exhaust system of the engine, for trapping NOx in exhaust gases emitted from the engine, wherein the exhaust emission control method comprises a regeneration operation-executing step of executing a regeneration operation for reducing SOx deposited on the NOx catalyst and causing the NOx catalyst to release the reduced SOx, the regeneration operation-executing step having a first regeneration operation-executing step of setting a control parameter for controlling operation of the engine to a first predetermined value that is capable of controlling exhaust gases to a predetermined reducing condition, and at the same time, controlling a temperature of the NOx catalyst within a predetermined target temperature range including a predetermined target temperature, a second regeneration operation-executing step of setting the control parameter to a second predetermined value that is capable of controlling exhaust gases to a predetermined reducing condition, and at the same time, controlling the temperature of the NOx catalyst to a temperature higher than the target temperature range, and a third regeneration operation-executing step of setting the control parameter to a third predetermined value that is capable of controlling exhaust gases to a predetermined reducing condition, and controlling the temperature of the NOx catalyst to a temperature lower than the target temperature range, the exhaust emission control method further comprising a catalyst temperature-detecting step of detecting the temperature of the NOx catalyst, and a regeneration operation-selecting of selecting, as the regeneration operation-executing step, the first regeneration operation-executing step when the detected temperature of the NOx catalyst is within the target temperature range, the second regeneration operation-executing step when the detected temperature of the NOx catalyst is lower than the target temperature range, and the third regeneration operation-executing step when the detected temperature of the NOx catalyst is higher than the target temperature range.

With the configuration of the engine control unit according to the third aspect of the present invention, it is possible to obtain the same advantageous effects as provided by the first aspect of the present invention.

Preferably, the exhaust emission control method further comprises a predetermined value-storing step of storing relationships between an operating condition of the engine, and the first to third predetermined values, respectively, an operating condition-detecting step of detecting the operating condition of the engine, and a predetermined value-setting step of setting one of the first to third predetermined values used in one of the first to third generation operation-executing step selected in the regeneration operation-selecting step, according to the detected operating condition of the engine, based on the relationships stored in the predetermined value-storing step.

Preferably, the exhaust emission control method further comprises an execution time period-setting step setting an execution time period of the regeneration operation executed in the second regeneration operation-executing step or the third regeneration operation-executing step, to a longer time period as a difference between the temperature of the NOx catalyst and the target temperature is larger, when the second regeneration operation-executing step or the third regeneration operation-executing step is selected, wherein the regeneration operation-selecting step holds a current selection until the set execution time period of the regeneration operation executed in the second regeneration operation-executing step or the third regeneration operation-executing step has elapsed.

Preferably, the control parameter includes at least one of injection timing of fuel to be supplied to the engine, injection pressure of the fuel, boost pressure of intake air drawn into the engine, and a degree of opening of a throttle valve for adjusting an intake air amount, and the second predetermined value is set to a more retarded value than the first predetermined value when the at least one control parameter is the injection timing, whereas when the at least one control parameter is the injection pressure of the fuel, the boost pressure of the intake air, or the degree of opening of the throttle valve, the second predetermined value is set to a smaller value than the first predetermined value.

Preferably, the control parameter includes at least one of injection timing of fuel to be supplied to the engine, injection pressure of the fuel, boost pressure of intake air drawn into the engine, and a degree of opening of a throttle valve for adjusting an intake air amount, and the third predetermined value is set to a more advanced value than the first predetermined value when the at least one control parameters is the injection timing, whereas when the at least one control parameter is the injection pressure of the fuel, the boost pressure of the intake air, or the degree of opening of the throttle valve, the third predetermined value is set to a larger value than the first predetermined value.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 8 is a diagram showing an example of a QINJCMD1 map which is used in the FIG. 4 process;

FIG. 9 is a diagram showing an example of a TINJCMD1 map which is used in the FIG. 4 process;

FIG. 10 is a diagram showing an example of a PRAIL-CMD1 map which is used in the FIG. 4 process;

FIG. 11 is a diagram showing an example of a PSCMD1 map which is used in the FIG. 4 process;

FIG. 12 is a diagram showing an example of a THCMD1 map which is used in the FIG. 4 process;

FIG. 13 is a diagram showing an example of a QPOSTCMD1 map which is used in the FIG. 4 process;

FIG. 14 is a diagram showing an example of a QINJCMD2 map which is used in the FIG. 5 process;

FIG. 15 is a diagram showing an example of a TINJCMD2 map which is used in the FIG. 5 process;

FIG. 16 is a diagram showing an example of a PRAIL-CMD2 map which is used in the FIG. 5 process;

FIG. 17 is a diagram showing an example of a PSCMD2 map which is used in the FIG. 5 process;

FIG. 18 is a diagram showing an example of a THCMD2 map which is used in the FIG. 5 process;

FIG. 19 is a diagram showing an example of a QPOSTCMD2 map which is used in the FIG. 5 process;

FIG. 20 is a diagram showing an example of a QINJCMD3 map which is used in the FIG. 6 process;

FIG. 21 is a diagram showing an example of a TINJCMD3 map which is used in the FIG. 6 process;

FIG. 22 is a diagram showing an example of a PRAIL-CMD3 map which is used in the FIG. 6 process;

FIG. 23 is a diagram showing an example of a PSCMD3 map which is used in the FIG. 6 process;

FIG. 24 is a diagram showing an example of a THCMD3 map which is used in the FIG. 6 process;

FIG. 25 is a diagram showing an example of a QPOSTCMD3 map which is used in the FIG. 6 process;

FIG. 27 is a schematic timing diagram showing an example of the operation of a variation of the regeneration control process.

DETAILED DESCRIPTION OF PREFERRED EMBODIMENTS

Figure 1:
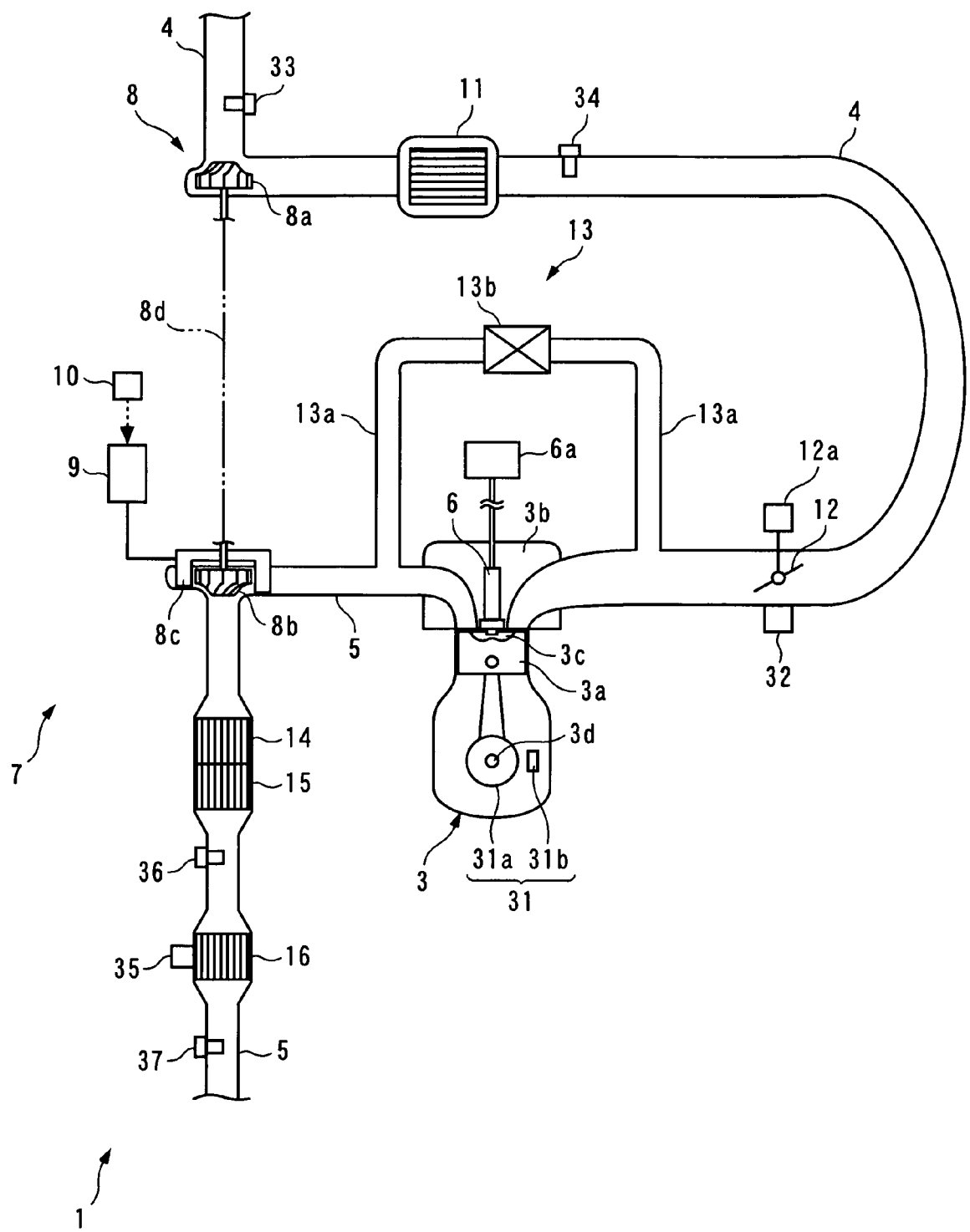
FIG. 1 is a schematic diagram of an exhaust emission control device according to an embodiment of the present invention, and an internal combustion engine to which is applied the exhaust emission control device.

The invention will now be described in detail with reference to the drawings showing preferred embodiment thereof. FIG. 1 schematically shows an exhaust emission control device 1 according to the present embodiment, and an internal combustion engine 3 to which is applied the exhaust emission control device 1. The internal combustion engine (hereinafter simply referred to as "the engine") 3 is a diesel engine that has in-line four cylinders (only one of which is shown), and is installed on a vehicle, not shown.

A combustion chamber 3c is defined between a piston 3a and a cylinder head 3b for each cylinder of the engine 3. The cylinder head 3b has an intake pipe 4 and an exhaust pipe 5 (exhaust system) connected thereto, with a fuel injection valve (hereinafter referred to as "the injector") 6 mounted therethrough such that it faces the combustion chamber 3c.

Figure 2:
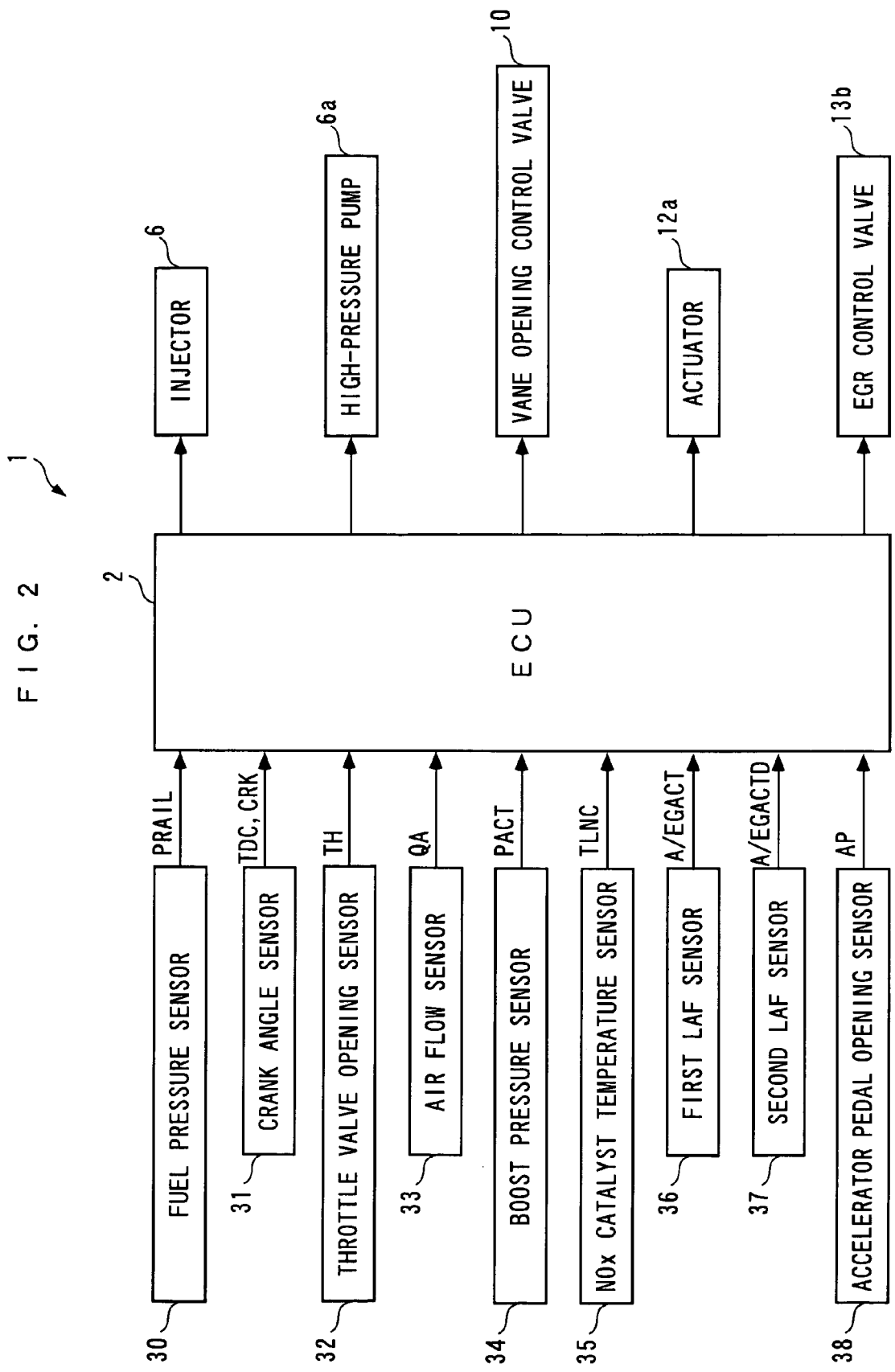
FIG. 2 is a schematic diagram of part of the exhaust emission control device according to the present embodiment.

The injector 6 is inserted into the combustion chamber 3c through a central portion of the top wall thereof, and is connected to a high-pressure pump 6a and a fuel tank, not shown, in the mentioned order via a common rail, not shown. The high-pressure pump 6a pressurizes fuel contained in the fuel tank to high pressure, and then sends the same via a common rail to the injector 6, which injects the pressurized fuel into the combustion chamber 3c. The injection pressure PRAIL of the fuel has target injection pressure PRAILCMD set by an ECU 2, described hereinafter, and by inputting a drive signal generated based on the target injection pressure PRAILCMD to the high-pressure pump 6a, the injection pressure PRAIL is controlled such that it becomes equal to the target injection pressure PRAILCMD (see FIG. 2). Further, a fuel pressure sensor 30 provided in the common rail detects the injection pressure PRAIL, and delivers a signal indicative of the sensed injection pressure PRAIL to the ECU 2. Further, the valve-opening time period of each injector 6 and the valve-opening timing and valve-closing timing thereof are controlled by a drive signal from the ECU 2, whereby a fuel injection amount and fuel injection timing of fuel injected from the injector 6 are controlled, respectively.

A magnet rotor 31a is mounted on a crankshaft 3d of the engine 3. The magnet rotor 31a and an MRE pickup 31b form a crank angle sensor 31 (operating condition-detecting means) which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the suction stroke thereof, and in the case of the four-cylinder engine of the illustrated example, it is delivered whenever the crankshaft 3d rotates through 180 degrees.

The engine 3 has a supercharging device 7 disposed therein. The supercharging device 7 is comprised of a supercharger 8 formed by a turbocharger, an actuator 9 connected to the supercharger 8, and a vane opening control valve 10.

The supercharger 8 includes a compressor blade 8a rotatably mounted in the intake pipe 4, a rotatable turbine blade 8b and a plurality of rotatable variable vanes 8c (only two of which are shown) provided in the exhaust pipe 5, and a shaft 8d integrally formed with the two blades 8a and 8b such that the shaft 8d connects them. In the supercharger 8, as the turbine blade 8b is driven for rotation by exhaust gases flowing through the exhaust pipe 5, the compressor blade 8a integrally formed with the turbine blade 8b is also rotated, whereby the supercharger 8 is caused to perform a supercharging operation for pressurizing intake air in the intake pipe 4.

The actuator 9 is of a diaphragm type which is operated by negative pressure, and is mechanically connected to the respective variable vanes 8c. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal generated by target boost pressure PSCMD set by the ECU 2, whereby negative pressure to be supplied to the actuator 9 is changed to change the degree of opening of each variable vane 8c. Thus, boost pressure PACT is controlled such that it becomes equal to the target boost pressure PSCMD.

An intercooler 11 of a water cooling type, and a throttle valve 12 are inserted into the intake pipe 4 at respective locations downstream of the supercharger 8 from upstream to downstream in the mentioned order. The intercooler 11 is provided for cooling intake air e.g. when the temperature of the intake air is made higher by the supercharging operation of the supercharging device 7. An actuator 12a comprised e.g. of a DC motor is connected to the throttle valve 12. A drive signal, which is generated based on a target throttle valve opening THCMD set by the ECU 2, is input to the actuator 12a, whereby the opening TH of the throttle valve 12 (hereinafter referred to as "the throttle valve opening TH") is controlled such that it becomes equal to the target throttle valve opening THCMD. Thus, an intake air amount is controlled. Further, a throttle valve opening sensor 32 detects the throttle valve opening TH, and delivers a signal indicative of the sensed throttle valve opening TH to the ECU 2.

Further, the intake pipe 4 has an air flow sensor 33 inserted therein at a location upstream of the supercharger 8, and a boost pressure sensor 34 inserted therein between the intercooler 11 and the throttle valve 12. The air flow sensor 33 detects the intake air amount QA, to deliver a signal indicative of the sensed intake air amount QA to the ECU 2, while the boost pressure sensor 34 detects boost pressure PACT in the intake pipe 4, to deliver a signal indicative of the sensed boost pressure PACT to the ECU 2.

Further, the engine 3 is provided with an EGR device 13 that has an EGR pipe 13a and an EGR control valve 13b. The EGR pipe 13a connects between a portion of the intake pipe 4 at a location downstream of the throttle valve 12 and a portion of the exhaust pipe 5 at a location upstream of the supercharger 8. Part of exhaust gases exhausted from the engine 3 is recirculated into the intake pipe 4 via the EGR pipe 13a as EGR gases, whereby combustion temperature in the combustion chamber 3c is lowered to decrease NOx contained in the exhaust gases.

The EGR control valve 13b is implemented by a linear solenoid valve inserted into the EGR pipe 13a, and the valve lift amount thereof is controlled by a drive signal from the ECU 2, whereby the amount of EGR gases is controlled.

A three-way catalyst 14, a filter 15 and a NOx catalyst 16 are provided in the exhaust pipe 5 at respective locations downstream of the supercharger 8 from upstream to downstream in the mentioned order. The three-way catalyst 14 oxidizes HC and CO and performs reduction of NOx in exhaust gases under a stoichiometric atmosphere, to thereby purify i.e. reduce exhaust emissions. The filter 15 is configured such that it collects particulates (hereinafter simply referred to as "PM" (Particulate Matter)), such as soot, from exhaust gases to thereby reduce the amount of PM emitted into the air.

The above-described NOx catalyst 16 traps (absorbs) NOx contained in exhaust gases under an oxidizing atmosphere in which the concentration of oxygen in exhaust gases is higher than the concentration of reducing agents, such as HC and CO, contained in the exhaust gases. Inversely, under a reducing atmosphere in which the concentration of reducing agents in exhaust gases is higher than the concentration of oxygen in the exhaust gases, the NOx catalyst 16 performs reduction of the trapped NOx using the reducing agents, to thereby purify exhaust emissions.

Furthermore, the NOx catalyst 16 is provided with a NOx catalyst temperature sensor 35 that detects the temperature TLNC of the NOx catalyst 16 (hereinafter referred to as "the catalyst temperature TLNC"), for delivering a signal indicative of the sensed catalyst temperature TLNC to the ECU 2. Further, first and second LAF sensors 36 and 37 are inserted into the exhaust pipe 5 at respective locations immediately upstream and downstream of the NOx catalyst 16. Each of the first and second LAF sensors 36 and 37 linearly detects the concentration of oxygen in exhaust gases in a broad air-fuel ratio range from a rich region to a lean region, and delivers a signal indicative of the sensed oxygen concentration to the ECU 2. Hereinafter, the concentration of oxygen in exhaust gases, detected by the first LAF sensor 36, is referred to as "the exhaust gas oxygen concentration A/EGACT", and the concentration of oxygen in exhaust gases, detected by the second LAF sensor 37, is referred to as "the downstream exhaust gas oxygen concentration A/EGACTD".

Further, an accelerator pedal opening sensor 38 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

The ECU 2 is implemented by a microcomputer comprised of an I/O interface, a CPU, a RAM, and a ROM. The detection signals from the aforementioned sensors 30 to 38 are input to the CPU after the I/O interface performs A/D conversion and waveform shaping thereon. Further, in response to these detection signals, the ECU 2 determines an operating condition of the engine 3, and based on the determined operating condition of the engine, performs engine control, such as control of the fuel injection amount of the injector 6 and the intake air amount QA, in accordance with control programs read from the ROM.

Further, the ECU 2 performs regeneration control for reducing SOx deposited on the NOx catalyst 16 and causing the NOx catalyst 16 to release the reduced SOx, to thereby restore the NOx trapping performance of the NOx catalyst 16 to regenerate the NOx catalyst 16. In the regeneration control, basically, the ECU 2 performs not only main injection in which fuel is injected from the injector 6 during the compression stroke to obtain output of the engine 3 but also post injection in which fuel is injected from the injector 6 in predetermined timing between the expansion stroke and the exhaust stroke, for reduction of SOx.

The fuel injection timing TINJ and fuel injection amount QINJ of fuel injected by the main injection (hereinafter referred to as "the main injection timing TINJ" and "the main injection amount QINJ", respectively) are set by the ECU2, and drive signals generated based on TINJ and QINJ are input from the ECU 2 to the injector 6, whereby the main injection timing TINJ and the main injection amount QINJ are controlled. Further, similarly, the fuel injection amount QPOST of fuel injected by the post injection (hereinafter referred to as "the post injection amount QPOST") is also controlled by the ECU 2.

In the present embodiment, the ECU 2 corresponds to regeneration operation-executing means, first regeneration operation-executing means, second regeneration operation-executing means, third regeneration operation-executing means, regeneration operation-selecting means, predetermined value-storing means, operating condition-detecting means, predetermined value-setting means, and execution time-setting means.

Figure 3:
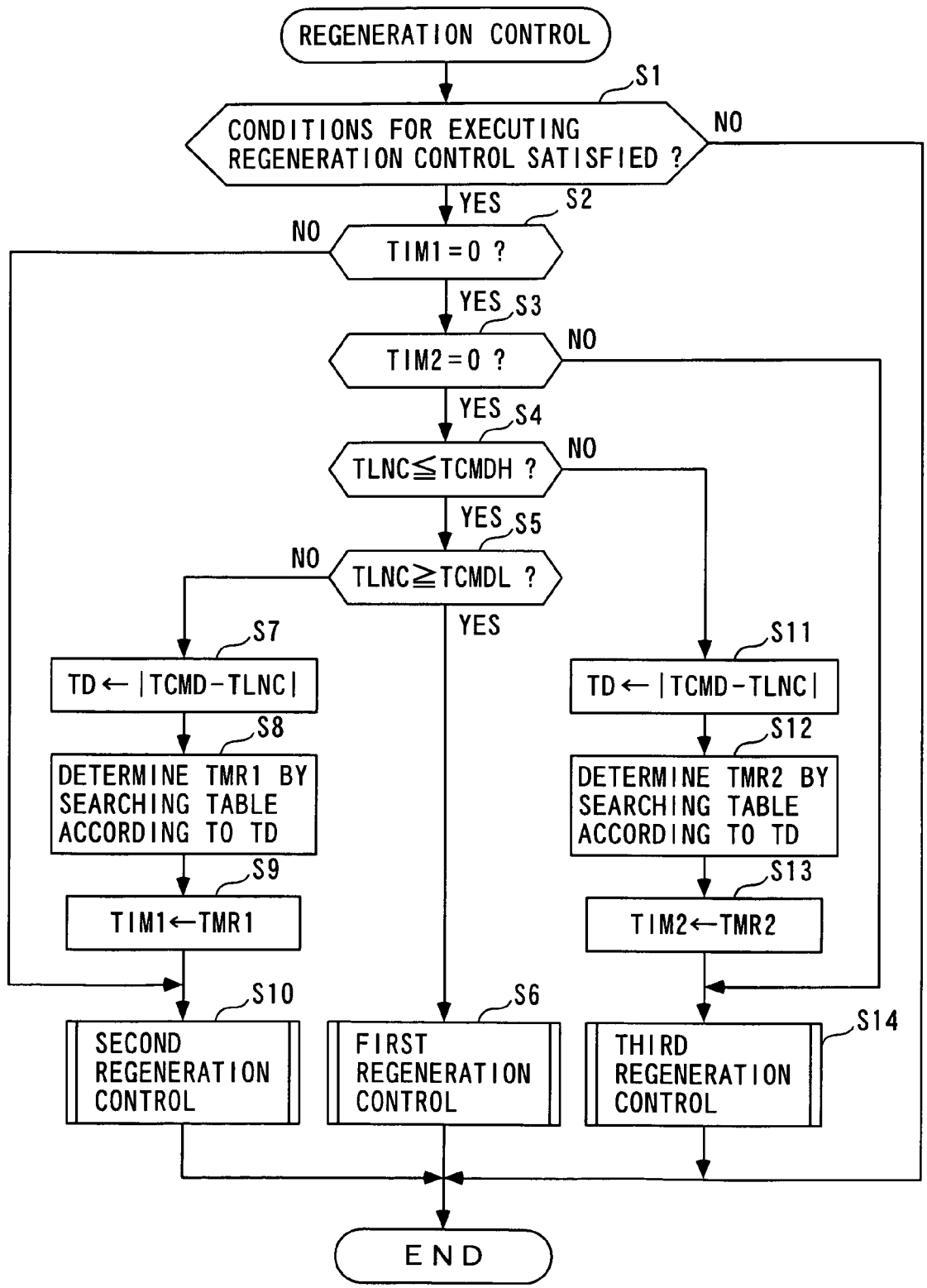
FIG. 3 is a flowchart showing a regeneration control process.

Next, a regeneration control process for executing the above-described regeneration control will be described with reference to FIG. 3. The present process is carried out in synchronism with input of the TDC signal. First, in a step 1 (shown as S1 in abbreviated form in FIG. 3; the following steps are also shown in abbreviated form), it is determined whether or not conditions for executing the regeneration control are satisfied. The conditions for executing the regeneration control are determined to be satisfied when there are satisfied all the following conditions (a) to (c):

(a) The cumulative value of the main injection amount QINJ is not smaller than a predetermined value.

(b) Conditions for executing the regeneration control process for regenerating the filter 15.

(c) Predetermined conditions based on the relationship between the exhaust gas oxygen concentration A/EGACT and the downstream exhaust gas oxygen concentration A/EGACTD.

If the answer to the question of the step 1 is negative (NO), i.e. if the conditions for executing the regeneration control are not satisfied, the present process is immediately terminated. On the other hand, if the answer to the question of the step 1 is affirmative (YES), i.e. if the conditions for executing the regeneration control are satisfied, it is determined in respective steps 2 and 3 whether or not the timer values TIM1 and TIM2 of first and second timers, both of which are of a down-count type, are equal to 0.

If both the answers to the questions of the steps 2 and 3 are affirmative (YES), it is determined in steps 4 and 5 whether or not the catalyst temperature TLNC is within a predetermined target temperature range defined by a first target temperature TCMDH and a second target temperature TCMDL. These first and second target temperatures TCMDH and TCMDL are set to respective temperatures higher and lower than a predetermined target temperature TCMD by a predetermined temperature (e.g. 10° C.). The target temperature TCMD is set to a predetermined temperature (e.g. 550° C.) slightly higher than a reducing temperature that is capable of reducing SOx deposited on the NOx catalyst 16. The target temperature range set as above corresponds to a range of temperatures that are higher than the above-described reducing temperature but do not melt the NOx catalyst 16.

If both the answers to the questions of the steps 4 and 5 are affirmative (YES), i.e. if the catalyst temperature TLNC is within the target temperature range defined by the first and second target temperatures TCMDH and TCMDL, a first regeneration control process is carried out so as to maintain the catalyst temperature TLNC (step 6), followed by terminating the present process. The first regeneration control process will be described in detail hereinafter.

On the other hand, if the answer to the question of the step 5 is negative (NO), i.e. if the catalyst temperature TLNC is lower than the target temperature range, the absolute value (|TCMD−TLNC|) of the difference between the target temperature TCMD and the catalyst temperature TLNC is calculated as a temperature difference TD (step 7). Then, a first execution time period TMR1 is calculated by searching a TMR1 table, not shown, according to the calculated temperature difference TD (step 8). In the TMR1 table, the first execution time period TMR1 is linearly set to a longer time period as the temperature difference TD is larger.

Next, the calculated first execution time period TMR1 is set as the timer value TIM1 of the first timer (step 9), and to make higher the catalyst temperature TLNC, a second regeneration control process is carried out (step 10), followed by terminating the present process. The second regeneration control process will be described in detail hereinafter. Further, by execution of the step 9, the answer to the question of the step 2 becomes negative (NO). In this case, the above-described step 10 is performed.

On the other hand, if the answer to the question of the step 4 is negative (NO), i.e. if the catalyst temperature TLNC is higher than the target temperature range, the temperature difference TD is calculated similarly to the step 7 (step 11). Next, a second execution time period TMR2 is calculated by searching a TMR2 table, not shown, according to the calculated temperature difference TD (step 12). In the TMR2 table, the second execution time period TMR2 is linearly set to a longer time period as the temperature difference TD is larger.

Then, the calculated second execution time period TMR2 is set as the timer value TIM2 of the second timer, and to lower the catalyst temperature TLNC, a third regeneration control process is carried out (step 14), followed by terminating the present process. The third regeneration control process will be described in detail hereinafter. Further, by execution of the step 13, the answer to the question of the step 3 becomes negative (NO). In this case, the above-described step 14 is performed.

Figure 4:
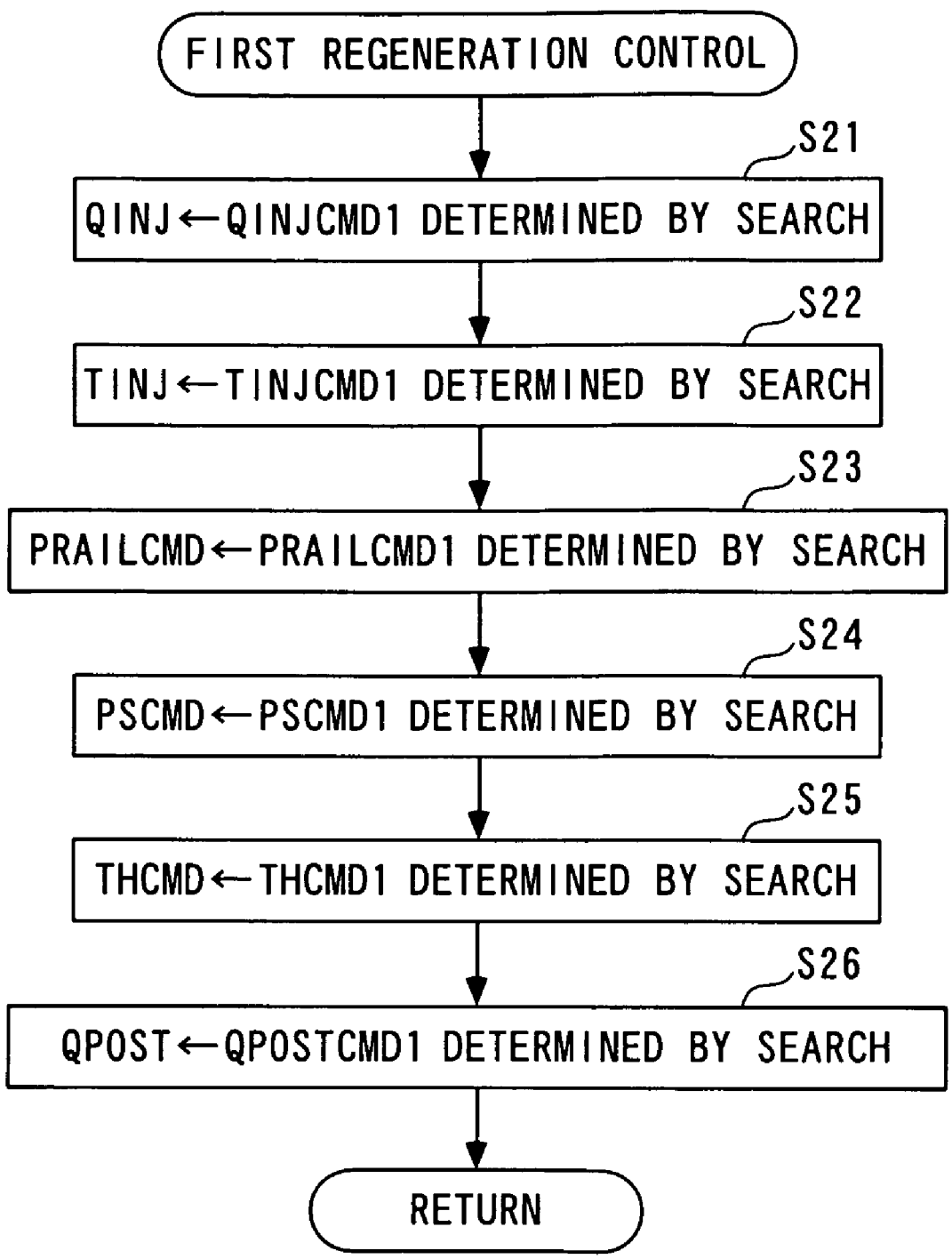
FIG. 4 is a flowchart showing a first regeneration control process a subroutine.

Next, the first regeneration control process executed in the aforementioned step 6 will be described with reference to FIG. 4. The first regeneration control process controls the exhaust gas oxygen concentration A/EGACT to a predetermined reduction concentration range including a predetermined reduction concentration A/EGREF, and the catalyst temperature TLNC to the above-described target temperature range, respectively, to thereby carrying out the first regeneration control. The reduction concentration range is defined by a first reduction concentration and a second reduction concentration. The first and second reduction concentrations are both determined by empirically determining the concentration of oxygen in exhaust gases when exhaust gases are under a reducing atmosphere that can reduce SOx deposited on the NOx catalyst 16. For example, the first reduction concentration is set to the concentration of oxygen in exhaust gases which is obtained when the air-fuel ratio of a mixture burned in the engine 3 is equal to 14.0, and the second reduction concentration is set to the concentration of oxygen in exhaust gases which is obtained when the above air-fuel ratio is equal to 14.5.

Figure 7:
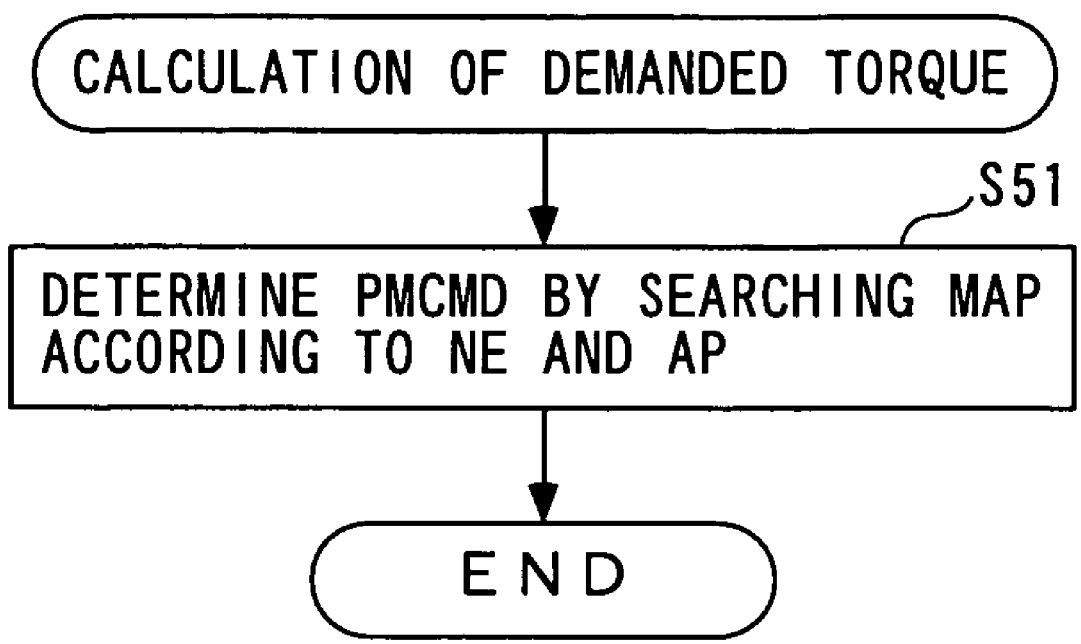
FIG. 7 is a flowchart showing a demanded torque-calculating process.

In the present process, first, in a step 21, a first target value QINJCMD1 of the main injection amount QINJ is calculated by searching a QINJCMD1 map shown in FIG. 8 according to the engine speed NE and a demanded torque PMCMD, and is set as the main injection amount QINJ. The demanded torque PMCMD is the torque demanded of the engine 3, and is calculated in a step 51 shown in FIG. 7 by searching a map, not shown, according to the engine speed NE and the accelerator pedal opening AP. In the above-described QINJCMD1 map, the first target value QINJCMD1 is set to a larger value as the engine speed NE is higher and the demanded torque PMCMD is larger.

Next, a first target value TINJCMD1 of the main injection timing TINJ is calculated by searching a TINJCMD1 map shown in FIG. 9 according to the engine speed NE and the demanded torque PMCMD, and is set as the main injection timing TINJ (step 22). In this TINJCMD1 map, the first target value TINJCMD1 is set to a more advanced value as the engine speed NE is higher and the demanded torque PMCMD is larger. Then, a first target value PRAILCMD1 of the injection pressure PRAIL, is calculated by searching a PRAILCMD1 map shown in FIG. 10 according to the engine speed NE and the demanded torque PMCMD, and is set as the target injection pressure PRAILCMD (step 23). In this PRAILCMD1 map, the first target value PRAILCMD1 is set to a larger value as the engine speed NE is higher and the demanded torque PMCMD is larger.

Then, a first target value PSCMD1 of the boost pressure PACT is calculated by searching a PSCMD1 map shown in FIG. 11 according to the engine speed NE and the demanded torque PMCMD, and is set as the aforementioned target boost pressure PSCMD (step 24). In this PSCMD1 map, the first target value PSCMD1 is set to a larger value as the engine speed NE is higher and the demanded torque PMCMD is larger. Next, a first target value THCMD1 of the throttle valve opening TH is calculated by searching a THCMD1 map shown in FIG. 12 according to the engine speed NE and the demanded torque PMCMD, and is set as the aforementioned target throttle valve opening THCMD (step 25). In this THCMD1 map, the first target value THCMD1 is set to a larger value as the engine speed NE is higher and the demanded torque PMCMD is larger.

Then, a first target value POSTCMD1 of the post injection amount QPOST is calculated by searching a QPOSTCMD1 map shown in FIG. 13 according to the engine speed NE and the demanded torque PMCMD, and is set as the aforementioned post injection amount QPOST (step 26), followed by terminating the present process.

The above respective maps shown in FIGS. 8 to 13 are formed by empirically determining the main injection amount QINJ, the main injection timing TINJ, the injection pressure PRAIL, the boost pressure PACT, the throttle valve opening TH, and the post injection amount QPOST when the excellent drivability of the engine 3 and reduced exhaust emissions are maintained, the exhaust gas oxygen concentration A/EGACT is within the aforementioned reduction concentration range, and the catalyst temperature TLNC is within the aforementioned target temperature range, and then mapping them according to the engine speed NE and the demanded torque PMCMD. This makes it possible to control the exhaust gas oxygen concentration A/EGACT and the catalyst temperature TLNC within the reduction concentration range and the target temperature range, respectively while ensuring the excellent drivability of the engine 3 and reduced exhaust emissions.

Figure 5:
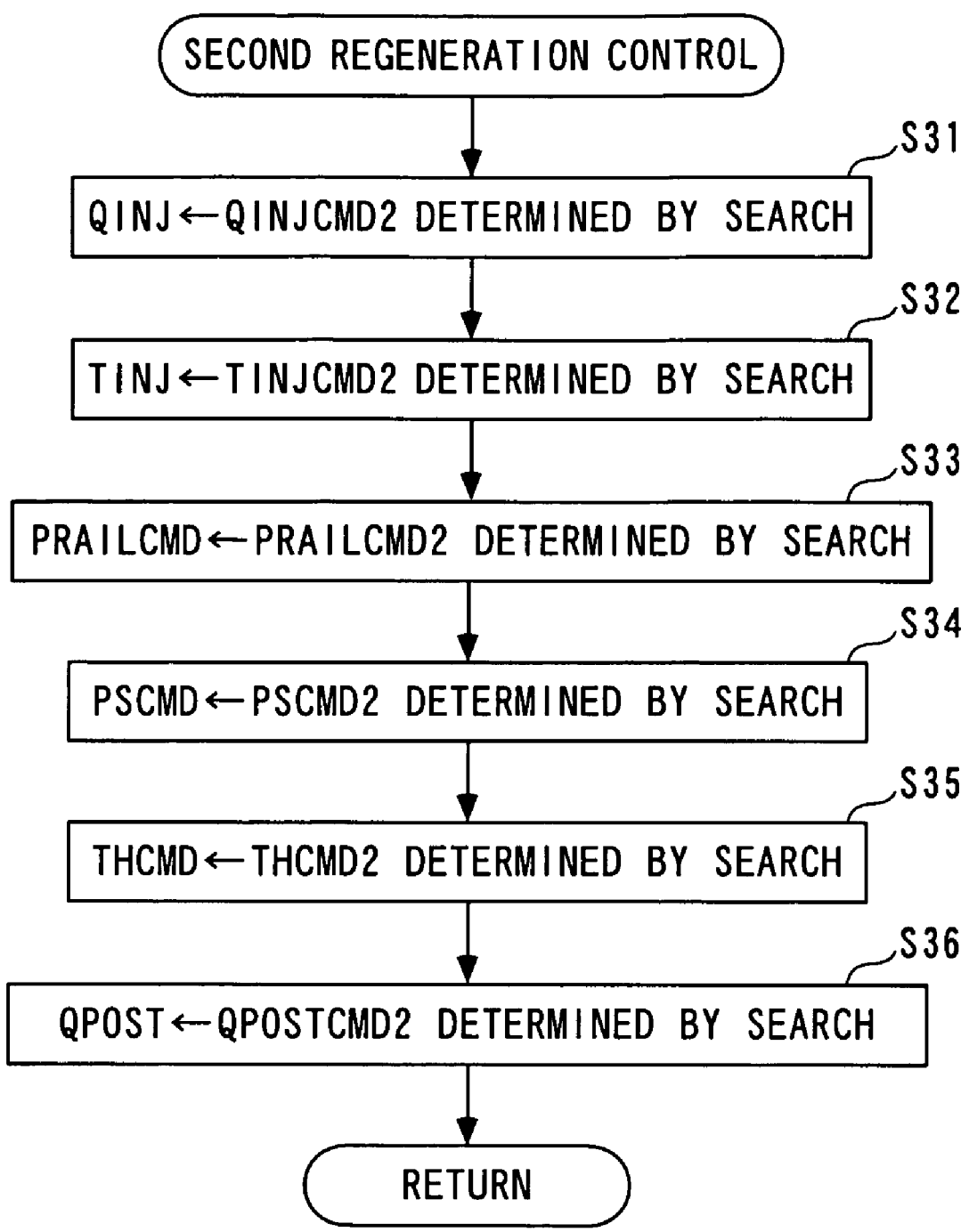
FIG. 5 is a flowchart showing a second regeneration control process a subroutine.

Next, the second regeneration control process executed in the aforementioned step 10 in FIG. 3 will be described with reference to FIG. 5. In the present process, the second regeneration control is carried out by setting the same main injection amount QINJ, main injection timing TINJ, target injection pressure PRAILCMD, target boost pressure PSCMD, target throttle valve opening THCMD, and post injection amount QPOST (hereinafter generically referred to as "the control parameters") as those in the above-described first regeneration control process. More specifically, second target values QINJCMD2 to QPOSTCMD2 of the respective control parameters QINJ to QPOST are calculated in respective steps 31 to 36 shown in FIG. 5 by searching a QINJCMD2 map, a TINJCMD2 map, a PRAILCMD2 map, a PSCMD2 map, a THCMD2 map, and a QPOSTCMD2 map shown in FIGS. 14 to 19 according to the engine speed NE and the demanded torque PMCMD, and are set as the control parameters QINJ to QPOST. Hereinafter, a description will be given of the above maps and the second target values QINJCMD2 to QPOSTCMD2.

The respective maps shown in FIGS. 14 to 19 are formed by empirically determining the main injection amount QINJ, the main injection timing TINJ, the injection pressure PRAIL, the boost pressure PACT, the throttle valve opening TH, and the post injection amount QPOST when the excellent drivability of the engine 3 and reduced exhaust emissions are maintained, the exhaust gas oxygen concentration A/EGACT is within the aforementioned reduction concentration range, and the catalyst temperature TLNC is higher than the target temperature range, and then mapping them according to the engine speed NE and the demanded torque PMCMD.

More specifically, in these maps, the second target value TINJCMD2 of the main injection timing TINJ is set to have the same tendency as that of the above-described first target value TINJCMD1 with respect to the engine speed NE and the demanded torque PMCMD, and is set to a more retarded value than the first target value TINJCMD1, as a whole. Further, the second target value PRAILCMD2 of the injection pressure PRAIL is set to have the same tendency as that of the above-described first target value PRAILCMD1 with respect to the NE value and the PMCMD value, and is set to a smaller value than the first target value PRAILCMD1, as a whole.

The second target value PSCMD2 of the boost pressure PACT is set to have the same tendency as that of the above-described first target value PSCMD1 with respect to the NE value and the PMCMD value, and is set to a smaller value than the first target value PSCMD1, as a whole. The second target value THCMD2 of the throttle valve opening TH is set to have the same tendency as that of the above-described first target value THCMD1 with respect to the NE value and the PMCMD value, and is set to a smaller value than the first target value THCMD1, as a whole.

While ensuring excellent drivability of the engine 3 and reduced exhaust emissions, the above-described second regeneration control makes it possible to control the exhaust gas oxygen concentration A/EGACT within the reduction concentration range, and increase the catalyst temperature TLNC, and makes it possible to control the catalyst temperature TLNC to a temperature higher than the target temperature range.

Figure 6:
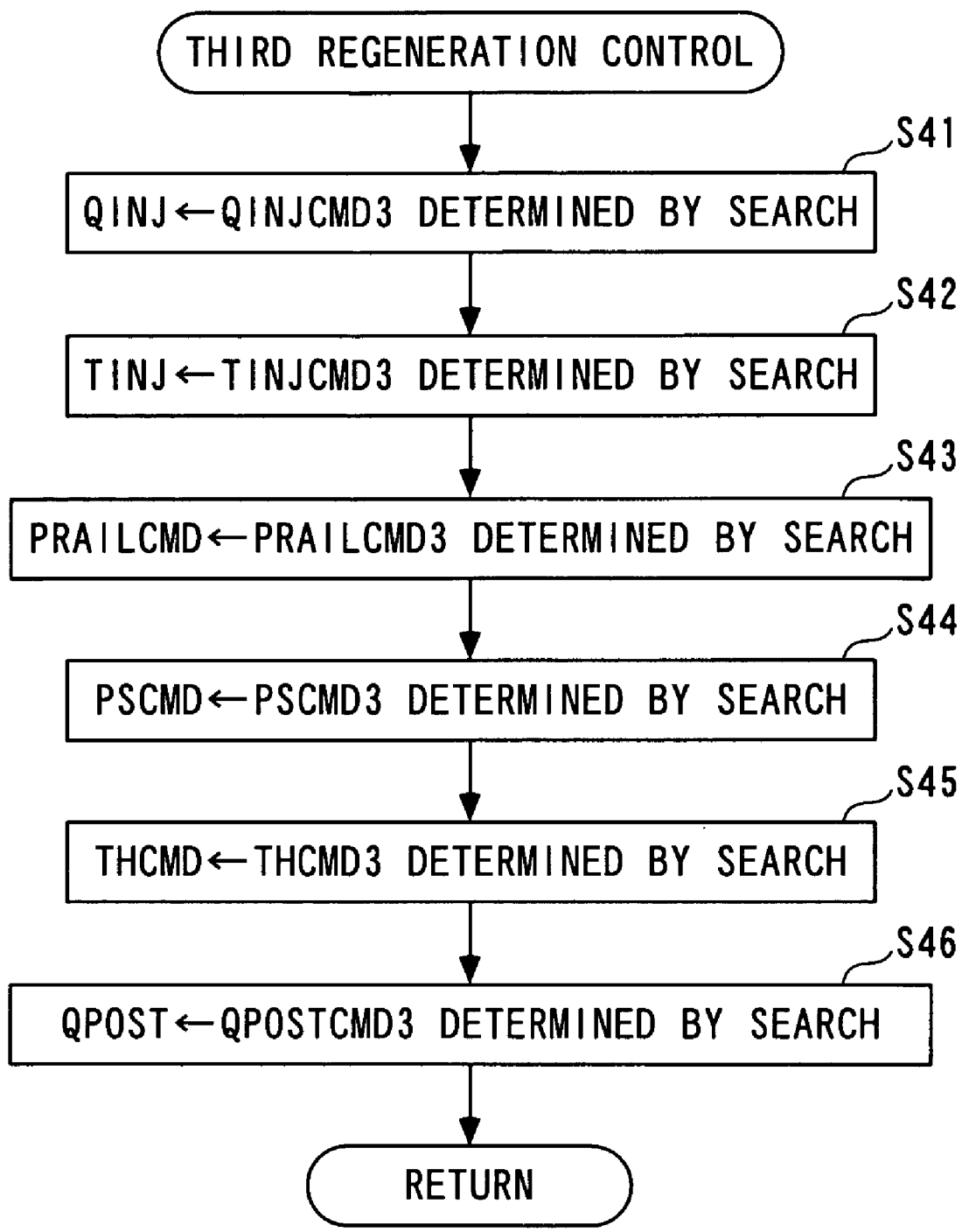
FIG. 6 is a flowchart showing a third regeneration control process a subroutine.

Next, the third regeneration control process executed in the aforementioned step 14 in FIG. 3 will be described with reference to FIG. 6. In the present process, the third regeneration control is carried out by setting the same control parameters QINJ to QPOST as those in the above-described first and second regeneration control processes. More specifically, third target values QINJCMD3 to QPOSTCMD3 of the respective control parameters QINJ to QPOST are calculated in respective steps 41 to 46 shown in FIG. 6 by searching a QINJCMD3 map, a TINJCMD3 map, a PRAILCMD3 map, a PSCMD3 map, a THCMD3 map, and a QPOSTCMD3 map shown in FIGS. 20 to 25 according to the engine speed NE and the demanded torque PMCMD, and are set as the control parameters QINJ to QPOST. Hereinafter, a description will be given of the above maps and the third target values QINJCMD3 to QPOSTCMD3.

The respective maps shown in FIGS. 20 to 25 are formed by empirically determining the main injection amount QINJ, the main injection timing TINJ, the injection pressure PRAIL, the boost pressure PACT, the throttle valve opening TH, and the post injection amount QPOST when the excellent drivability of the engine 3 and reduced exhaust emissions are maintained, and when the exhaust gas oxygen concentration A/EGACT is within the aforementioned reduction concentration range, and the catalyst temperature TLNC is lower than the target temperature range, and then mapping them according to the engine speed NE and the demanded torque PMCMD.

More specifically, in these maps, the third target value TINJCMD3 of the main injection timing TINJ is set to have the same tendency as that of the above-described first target value TINJCMD1 with respect to the engine speed NE and the demanded torque PMCMD, and is set to a more advanced value than the first target value TINJCMD1, as a whole. Further, the third target value PRAILCMD3 of the injection pressure PRAIL is set to have the same tendency as that of the above-described first target value PRAILCMD1 with respect to the NE value and the PMCMD value, and set to a larger value than the first target value PRAILCMD1, as a whole.

The third target value PSCMD3 of the boost pressure PACT is set to have the same tendency as that of the above-described first target value PSCMD1 with respect to the NE value and the PMCMD value, and is set to a larger value than the first target value PSCMD1, as a whole. The third target value THCMD3 of the throttle valve opening TH is set to have the same tendency as that of the above-described first target value THCMD1 with respect to the NE value and the PMCMD value, and is set to a larger value than the first target value THCMD1, as a whole.

While ensuring excellent drivability of the engine 3 and reduced exhaust emissions, the above-described third regeneration control makes it possible to control the exhaust gas oxygen concentration A/EGACT within the reduction concentration range, and lower the catalyst temperature TLNC, and makes it possible to control the catalyst temperature TLNC to a temperature lower than the target temperature range.

Figure 26:
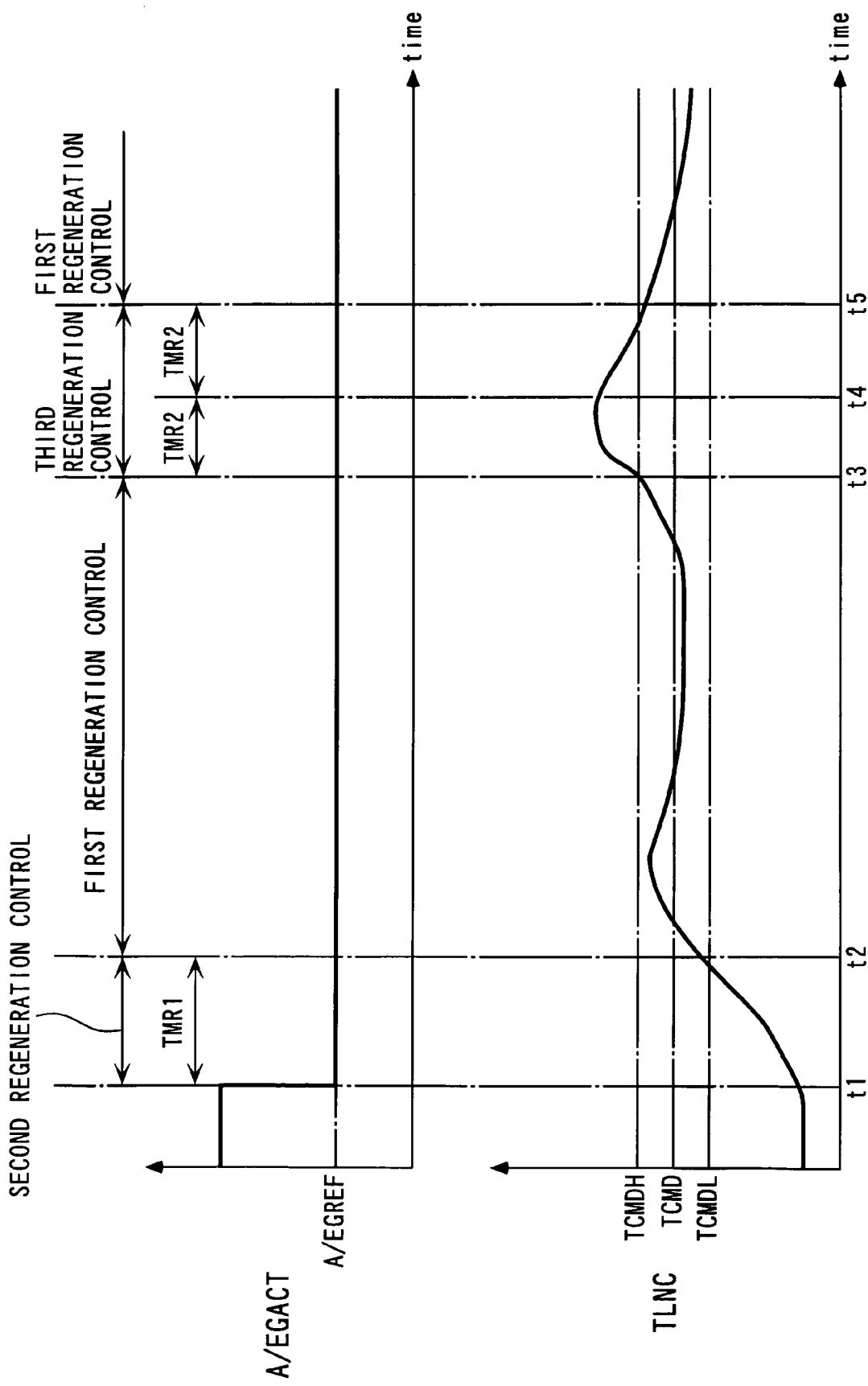
FIG. 26 is a schematic timing diagram showing an example of the operation of the regeneration control process.

FIG. 26 schematically shows an example of the operation of the above-described regeneration control process. If it is determined in the aforementioned step 1 that the conditions for executing the regeneration control are satisfied (time point t1), and the current catalyst temperature TLNC is lower than the target temperature range defined by the above-mentioned first and second target temperatures TCMDH and TCMDL, the second regeneration control process is executed, whereby the exhaust gas oxygen concentration A/EGACT becomes equal to the reduction concentration A/EGREF to make higher the catalyst temperature TLNC. Further, at the start of the second regeneration control process, a first execution time period TMR1 is calculated according to the current temperature difference TD(|TCMD−TLNC|), and the second regeneration control process is carried out until the calculated first execution time period TMR1 has elapsed irrespective of the relationship between the catalyst temperature TLNC and the target temperature range (NO to the step 2; execution of the step 10). When the first execution time period TMR1 has elapsed (time point t2), if the current catalyst temperature TLNC is within the target temperature range, the first regeneration control process is executed thereafter. As a result, the catalyst temperature TLNC is maintained within the target temperature range while the exhaust gas oxygen concentration A/EGACT remains equal to the reduction concentration A/EGREF.

During execution of the first regeneration control process, when unburned fuel attached to the exhaust pipe 5 is burned, for example, whereby the catalyst temperature TLNC is raised to be made higher than the target temperature range (time point t3), the third regeneration control process is carried out. This makes it possible to suppress a rise in the catalyst temperature TLNC while the exhaust gas oxygen concentration A/EGACT remains equal to the reduction concentration A/EGREF. Further, at the start of the third regeneration control process, a second execution time period TMR2 is calculated according to the current temperature difference TD, and the third regeneration control process is carried out until the calculated second execution time period TMR2 has elapsed irrespective of the relationship between the catalyst temperature TLNC and the target temperature range (NO to the step 3; execution of the step 14).

When the current catalyst temperature TLNC remains higher than the target temperature range after the second execution time period TMR2 has elapsed (time point t4), the second execution time period TMR2 is calculated again according to the current temperature difference TD, and the third regeneration control process is carried out until the calculated second execution time period TMR2 has elapsed. Thus, the catalyst temperature TLNC is lowered while the exhaust gas oxygen concentration A/EGACT remains equal to the reduction concentration A/EGREF.

After that, when the second execution time period TMR2 has elapsed (time point t5), if the current catalyst temperature TLNC is within the target temperature range, the first regeneration control process is executed, whereafter the first regeneration control process is continued so long as the catalyst temperature TLNC is within the target temperature range (from time point t5). As described above, by the regeneration control process, it is possible to control the exhaust gas oxygen concentration A/EGACT and the catalyst temperature TLNC in the vicinities of the reduction concentration A/EGREF and the target temperature range, respectively. This makes it possible to reduce SOx deposited on the NOx catalyst 16, and cause the NOx catalyst to release the reduced SOx, whereby it is possible to properly regenerate the NOx catalyst 16.

As described hereinabove, according to the present embodiment, the first to third regeneration control processes are selected and executed according the relationship between the catalyst temperature TLNC and the target temperature range, and hence there is no need to interrupt the regeneration control so as to prevent the NOx catalyst 16 from being overheated, whereby it is possible to continuously carry out the regeneration control. Therefore, compared with the control by the conventional exhaust emission control device, it is possible to terminate the regeneration control in a shorter time period, thereby making it possible to enhance fuel economy. Further, the aforementioned control parameter calculation-type feedback control is not carried out but the control parameters QINJ to QPOST are set to the first to third target values QINJCMD1 to QPOSTCMD1, QINJCMD2 to QPOSTCMD2, and QINJCMD3 to QPOSTCMD3, which are set in advance. This makes it possible to control the exhaust gas oxygen concentration A/EGACT and the catalyst temperature TLNC in the vicinities of the reduction concentration range and the target temperature range, respectively, without causing interference between the feedback control of the exhaust gas oxygen concentration A/EGACT and the feedback control of the catalyst temperature TLNC, as described hereinbefore, thereby making it possible to suppress computation load on the ECU 2.

Furthermore, the control parameters QINJ to QPOST are set to the first to third target values QINJCMD1 to QPOSTCMD1, QINJCMD2 to QPOSTCMD2, and QINJCMD3 to QPOSTCMD3, which are determined according to the engine speed NE and the demanded torque PMCMD, so that it is possible to ensure reduced exhaust emissions and excellent drivability of the engine 3. Further, since the first regeneration control process is employed in addition to the second and third regeneration control processes, it is possible to suppress switching of the regeneration control, thereby making it possible to ensure stable and excellent drivability and reduced exhaust emissions.

Furthermore, the second and third regeneration control processes are carried out until the second and third execution time periods TMR2 and TMR3 have elapsed, respectively, and the second and third execution time periods TMR2 and TMR3 are set such that they become longer as the temperature difference TD is larger. This makes it possible to sufficiently raise or lower the catalyst temperature TLNC.

Further, since the main injection timing TINJ, the target injection pressure PRAILCMD, the target boost pressure PSCMD, and the target throttle valve opening THCMD are used as parameters for performing the regeneration control, it is possible to properly control the exhaust gas oxygen concentration A/EGACT and the catalyst temperature TLNC in the vicinities of the reduction concentration range and the target temperature range, respectively. Furthermore, the second target value TINJCMD2 of the main injection timing TINJ is set to be more retarded than the first target value TINJCMD1, and the respective second target values PRAILCMD2, PSCMD2 and THCMD2 of the injection pressure PRAIL, the boost pressure PACT, and the throttle valve opening TH are set to be smaller than the first target values PRAILCMD1, PSCMD1 and THCMD1. Therefore, in the second regeneration control, it is possible to properly control the catalyst temperature TLNC to a higher temperature than the target catalyst temperature range.

Further, the third target value TINJCMD3 of the main injection timing TINJ is set to be more advanced than the first target value TINJCMD1, and the respective third target values PRAILCMD3, PSCMD3 and THCMD3 of the injection pressure PRAIL, the boost pressure PACT, and the throttle valve opening TH are set to be larger than the first target values PRAILCMD1, PSCMD1 and THCMD1. Therefore, in the third regeneration control, it is possible to properly control the catalyst temperature TLNC to a lower temperature than the target catalyst temperature range.

It should be noted that the above-described embodiment is an example of a case in which the target temperature TCMD and the target temperature range are constant, these may be changed in the following case: For example, when a considerably large amount of PM is deposited on the filter 15, if the regeneration control of the NOx catalyst 16 is carried out, the large amount of PM deposited on the filter 15 is burned along with combustion of unburned fuel in exhaust gases, which sometimes causes thermal runaway. In this case, to solve the problem, as shown in FIG. 27, the target temperature TCMD, and the first and second target temperatures TCMDH and TCMDL are once set to predetermined temperatures TCMDL, TCMDHL, and TCMDLL lower than TCMD, TCMDH and TCMDL, respectively, and then, regeneration control is executed (from time point t1'). After that, when a certain time period has elapsed (time point t2'), the target temperature TCMD, and the first and second target temperatures TCMDH and TCMDL may be returned to normal temperatures TCMDN, TCMDHN and TCMDLN.

In this case, in the first regeneration control process, the first target values QINJCMD1 to QPOSTCMD1 are set in advance such that the catalyst temperature TLNC is controlled to a target temperature range which is set when the target temperature TCMD, and the first and second target temperatures TCMDH and TCMDL are equal to the predetermined temperatures TCMDL, TCMDHL, and TCMDLL, respectively. Further, after the target temperature TCMD, and the first and second target temperatures TCMDH and TCMDL are changed to the normal temperatures TCMDN, TCMDHN and TCMDLN, respectively, when the catalyst temperature TLNC is lower than the target temperature range, the second regeneration control process is carried out, whereas when the catalyst temperature TLNC is higher than the target temperature range, the third regeneration control process is carried out. From the above, even when the target temperature range is changed, in both cases before and after changing the target temperature range, it is possible to control the catalyst temperature TLNC in the vicinity of the changed target temperature range.

It should be noted that the present invention is by no means limited to the embodiment described above, but it can be practiced in various forms. For example, although in the above-described embodiment, the main injection amount QINJ, the main injection timing TINJ, the target injection pressure PRAILCMD, the target boost pressure PSCMD, the target throttle valve opening THCMD, and the post injection amount QPOST are all used as control parameters of the present invention, at least one of them may be used.

For example, when only the main injection amount QINJ or the post injection amount QPOST is used as a control parameter, the amount of unburned fuel to be burned in the exhaust pipe 5 including the NOx catalyst 16 becomes larger as the main injection amount QINJ or the post injection amount QPOST is larger, whereby the catalyst temperature TLNC is made higher. Therefore, the second target value QINJCMD2 or QPOSTCMD2 may be set to a larger value than the first target value QINJCMD1 or QPOSTCMD1, respectively, while the third target value QINJCMD3 or QPOSTCMD3 is set to a smaller value than the first target value QINJCMD1 or QPOSTCMD1, respectively. It should be noted that in this case, it is necessary to set the second and third target values QINJCMD2 and QINJCMD3, or QPOSTCMD2 and QPOSTCMD3 with a view not only to controlling the catalyst temperature TLNC as described above but also to controlling the exhaust gas oxygen concentration A/EGACT within the reduction concentration range.

Further, the control parameters in the present invention are not limited to the parameters used in the above-described embodiment, but any other suitable parameter may be used insofar as it is a parameter which is for controlling the operation of the engine 3, and at the same time capable of controlling the exhaust gas oxygen concentration A/EGACT and the catalyst temperature TLNC. For example, the fuel injection amount of a fuel injection valve provided in the exhaust pipe 5 for supplying fuel to the NOx catalyst 16 may be used as a control parameter.

Furthermore, although in the above-described embodiment, the first to third target values QINJCMD1 to QPOSTCMD1, QINJCMD2 to QPOSTCMD2, and QINJCMD3 to QPOSTCMD3 are calculated by searching the associated maps, they may be determined as follows: For example, an equation indicative of the relationship between the above target values, the engine speed NE and the demanded torque PMCMD may be stored in advance, and the first to third target values QINJCMD1 to QPOSTCMD1, QINJCMD2 to QPOSTCMD2, and QINJCMD3 to QPOSTCMD3 may be calculated by the equation according to the engine speed NE and the demanded torque PMCMD.

Further, although in the above-described embodiment, the engine speed NE and the demanded torque PMCMD are used as operating condition parameters, this is not limitative, but any other suitable parameter may be used insofar as it is a parameter indicative of an operating condition of the engine 3. Furthermore, the present invention may be applied not only to the diesel engine but also to a gasoline engine, such as a lean burn engine, and various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, comprising:
   a NOx catalyst that is disposed in an exhaust system of the engine, for trapping NOx in exhaust gases emitted from the engine; and
   regeneration operation-executing means for executing a regeneration operation for reducing SOx deposited on said NOx catalyst and causing said NOx catalyst to release the reduced SOx,
   said regeneration operation-executing means having:
   first regeneration operation-executing means for setting a control parameter for controlling operation of the engine to a first predetermined value that is capable of controlling exhaust gases to a predetermined reducing condition, and at the same time, controlling a temperature of said NOx catalyst within a predetermined target temperature range including a predetermined target temperature,
   second regeneration operation-executing means for setting the control parameter to a second predetermined value that is capable of controlling exhaust gases to a predetermined reducing condition, and at the same time, controlling the temperature of said NOx catalyst to a temperature higher than the target temperature range, and
   third regeneration operation-executing means for setting the control parameter to a third predetermined value that is capable of controlling exhaust gases to a predetermined reducing condition, and controlling the temperature of said NOx catalyst to a temperature lower than the target temperature range,
   the exhaust emission control device further comprising:
   catalyst temperature-detecting means for detecting the temperature of said NOx catalyst; and
   regeneration operation-selecting means for selecting, as said regeneration operation-executing means, said first regeneration operation-executing means when the detected temperature of said NOx catalyst is within the target temperature range, said second regeneration operation-executing means when the detected temperature of said NOx catalyst is lower than the target temperature range, and said third regeneration operation-executing means when the detected temperature of said NOx catalyst is higher than the target temperature range.

2. An exhaust emission control device as claimed in claim 1, further comprising:
   predetermined value-storing means for storing relationships between an operating condition of the engine, and the first to third predetermined values, respectively;
   operating condition-detecting means for detecting the operating condition of the engine; and
   predetermined value-setting means for setting one of the first to third predetermined values used by one of said first to third generation operation-executing means selected by said regeneration operation-selecting means, according to the detected operating condition of the engine, based on the relationships stored in said predetermined value-storing means.

3. An exhaust emission control device as claimed in claim 1, further comprising execution time period-setting means for setting an execution time period of the regeneration operation executed by said second regeneration operation-executing means or said third regeneration operation-executing means, to a longer time period as a difference between the temperature of said NOx catalyst and the target temperature is larger, when said second regeneration operation-executing means or said third regeneration operation-executing means is selected,
   wherein said regeneration operation-selecting means holds a current selection until the set execution time period of the regeneration operation executed by said second regeneration operation-executing means or said third regeneration operation-executing means has elapsed.

4. An exhaust emission control device as claimed in claim 1, wherein the control parameter includes at least one of injection timing of fuel to be supplied to the engine, injection pressure of the fuel, boost pressure of intake air drawn into the engine, and a degree of opening of a throttle valve for adjusting an intake air amount, and
   wherein the second predetermined value is set to a more retarded value than the first predetermined value when the at least one control parameter is the injection timing, whereas when the at least one control parameter is the injection pressure of the fuel, the boost pressure of the intake air, or the degree of opening of the throttle valve, the second predetermined value is set to a smaller value than the first predetermined value.

5. An exhaust emission control device as claimed in claim 1, wherein the control parameter includes at least one of injection timing of fuel to be supplied to the engine, injection pressure of the fuel, boost pressure of intake air drawn into the engine, and a degree of opening of a throttle valve for adjusting an intake air amount, and
   wherein the third predetermined value is set to a more advanced value than the first predetermined value when the at least one control parameters is the injection timing, whereas when the at least one control parameter is the injection pressure of the fuel, the boost pressure of the intake air, or the degree of opening of the throttle valve, the third predetermined value is set to a larger value than the first predetermined value.

6. An exhaust emission control method for an internal combustion engine including a NOx catalyst that is disposed in an exhaust system of the engine, for trapping NOx in exhaust gases emitted from the engine, comprising:

a regeneration operation-executing step of executing a regeneration operation for reducing SOx deposited on said NOx catalyst and causing said NOx catalyst to release the reduced SOx, said regeneration operation-executing step having:

a first regeneration operation-executing step of setting a control parameter for controlling operation of the engine to a first predetermined value that is capable of controlling exhaust gases to a predetermined reducing condition, and at the same time, controlling a temperature of said NOx catalyst within a predetermined target temperature range including a predetermined target temperature, a second regeneration operation-executing step of setting the control parameter to a second predetermined value that is capable of controlling exhaust gases to a predetermined reducing condition, and at the same time, controlling the temperature of said NOx catalyst to a temperature higher than the target temperature range, and a third regeneration operation-executing step of setting the control parameter to a third predetermined value that is capable of controlling exhaust gases to a predetermined reducing condition, and controlling the temperature of said NOx catalyst to a temperature lower than the target temperature range, the exhaust emission control method further comprising:

a catalyst temperature-detecting step of detecting the temperature of said NOx catalyst; and a regeneration operation-selecting of selecting, as said regeneration operation-executing step, said first regeneration operation-executing step when the detected temperature of said NOx catalyst is within the target temperature range, said second regeneration operation-executing step when the detected temperature of said NOx catalyst is lower than the target temperature range, and said third regeneration operation-executing step when the detected temperature of said NOx catalyst is higher than the target temperature range.

7. An exhaust emission control method as claimed in claim 6, further comprising:

a predetermined value-storing step of storing relationships between an operating condition of the engine, and the first to third predetermined values, respectively;

an operating condition-detecting step of detecting the operating condition of the engine; and a predetermined value-setting step of setting one of the first to third predetermined values used in one of said first to third generation operation-executing step selected in said regeneration operation-selecting step, according to the detected operating condition of the engine, based on the relationships stored in said predetermined value-storing step.

8. An exhaust emission control method as claimed in claim 6, further comprising an execution time period-setting step setting an execution time period of the regeneration operation executed in said second regeneration operation-executing step or said third regeneration operation-executing step, to a longer time period as a difference between the temperature of the NOx catalyst and the target temperature is larger, when said second regeneration operation-executing step or said third regeneration operation-executing step is selected, wherein said regeneration operation-selecting step holds a current selection until the set execution time period of the regeneration operation executed in said second regeneration operation-executing step or said third regeneration operation-executing step has elapsed.

9. An exhaust emission control method as claimed in claim 6, wherein the control parameter includes at least one of injection timing of fuel to be supplied to the engine, injection pressure of the fuel, boost pressure of intake air drawn into the engine, and a degree of opening of a throttle valve for adjusting an intake air amount, and wherein the second predetermined value is set to a more retarded value than the first predetermined value when the at least one control parameter is the injection timing, whereas when the at least one control parameter is the injection pressure of the fuel, the boost pressure of the intake air, or the degree of opening of the throttle valve, the second predetermined value is set to a smaller value than the first predetermined value.

10. An exhaust emission control method as claimed in claim 6, wherein the control parameter includes at least one of injection timing of fuel to be supplied to the engine, injection pressure of the fuel, boost pressure of intake air drawn into the engine, and a degree of opening of a throttle valve for adjusting an intake air amount, and wherein the third predetermined value is set to a more advanced value than the first predetermined value when the at least one control parameters is the injection timing, whereas when the at least one control parameter is the injection pressure of the fuel, the boost pressure of the intake air, or the degree of opening of the throttle valve, the third predetermined value is set to a larger value than the first predetermined value.

11. An engine control unit including a control program for causing a compute to execute an exhaust emission control method for an internal combustion engine including a NOx catalyst that is disposed in an exhaust system of the engine, for trapping NOx in exhaust gases emitted from the engine, wherein the exhaust emission control method comprises:

a regeneration operation-executing step of executing a regeneration operation for reducing SOx deposited on said NOx catalyst and causing said NOx catalyst to release the reduced SOx, said regeneration operation-executing step having:

a first regeneration operation-executing step of setting a control parameter for controlling operation of the engine to a first predetermined value that is capable of controlling exhaust gases to a predetermined reducing condition, and at the same time, controlling a temperature of said NOx catalyst within a predetermined target temperature range including a predetermined target temperature, a second regeneration operation-executing step of setting the control parameter to a second predetermined value that is capable of controlling exhaust gases to a predetermined reducing condition, and at the same time, controlling the temperature of said NOx catalyst to a temperature higher than the target temperature range, and a third regeneration operation-executing step of setting the control parameter to a third predetermined value that is capable of controlling exhaust gases to a predetermined reducing condition, and controlling the temperature of said NOx catalyst to a temperature lower than the target temperature range, the exhaust emission control method further comprising:

a catalyst temperature-detecting step of detecting the temperature of said NOx catalyst; and a regeneration operation-selecting of selecting, as said regeneration operation-executing step, said first regeneration operation-executing step when the detected temperature of said NOx catalyst is within the target temperature range, said second regeneration operation-executing step when the detected temperature of said NOx catalyst is lower than the target temperature range, and said third regeneration operation-executing step when the detected temperature of said NOx catalyst is higher than the target temperature range.

12. An engine control unit as claimed in claim 11, wherein the exhaust emission control method further comprises:
a predetermined value-storing step of storing relationships between an operating condition of the engine, and the first to third predetermined values, respectively;
an operating condition-detecting step of detecting the operating condition of the engine; and
a predetermined value-setting step of setting one of the first to third predetermined values used in one of said first to third generation operation-executing step selected in said regeneration operation-selecting step, according to the detected operating condition of the engine, based on the relationships stored in said predetermined value-storing step.

13. An engine control unit as claimed in claim 11, wherein the exhaust emission control method further comprises an execution time period-setting step setting an execution time period of the regeneration operation executed in said second regeneration operation-executing step or said third regeneration operation-executing step, to a longer time period as a difference between the temperature of the NOx catalyst and the target temperature is larger, when said second regeneration operation-executing step or said third regeneration operation-executing step is selected, and wherein said regeneration operation-selecting step holds a current selection until the set execution time period of the regeneration operation executed in said second regeneration operation-executing step or said third regeneration operation-executing step has elapsed.

14. An engine control unit as claimed in claim 11, wherein the control parameter includes at least one of injection timing of fuel to be supplied to the engine, injection pressure of the fuel, boost pressure of intake air drawn into the engine, and a degree of opening of a throttle valve for adjusting an intake air amount, and
wherein the second predetermined value is set to a more retarded value than the first predetermined value when the at least one control parameter is the injection timing, whereas when the at least one control parameter is the injection pressure of the fuel, the boost pressure of the intake air, or the degree of opening of the throttle valve, the second predetermined value is set to a smaller value than the first predetermined value.

15. An engine control unit as claimed in claim 11, wherein the control parameter includes at least one of injection timing of fuel to be supplied to the engine, injection pressure of the fuel, boost pressure of intake air drawn into the engine, and a degree of opening of a throttle valve for adjusting an intake air amount, and
wherein the third predetermined value is set to a more advanced value than the first predetermined value when the at least one control parameters is the injection timing, whereas when the at least one control parameter is the injection pressure of the fuel, the boost pressure of the intake air, or the degree of opening of the throttle valve, the third predetermined value is set to a larger value than the first predetermined value.

* * * * *